(12) United States Patent
Niikura

(10) Patent No.: US 10,418,918 B2
(45) Date of Patent: Sep. 17, 2019

(54) ELECTROSTATIC ACTUATOR, SWITCH DEVICE AND POWER SUPPLY DEVICE

(71) Applicant: SONY CORPORATION, Tokyo (JP)

(72) Inventor: Hideo Niikura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 76 days.

(21) Appl. No.: 15/547,603

(22) PCT Filed: Dec. 28, 2015

(86) PCT No.: PCT/JP2015/086556
§ 371 (c)(1),
(2) Date: Jul. 31, 2017

(87) PCT Pub. No.: WO2016/132658
PCT Pub. Date: Aug. 25, 2016

(65) Prior Publication Data
US 2018/0026551 A1 Jan. 25, 2018

(30) Foreign Application Priority Data

Feb. 18, 2015 (JP) .................................. 2015-029472

(51) Int. Cl.
*H01H 36/00* (2006.01)
*H02N 1/00* (2006.01)
*H01H 59/00* (2006.01)

(52) U.S. Cl.
CPC ............. *H02N 1/006* (2013.01); *H02N 1/008* (2013.01); *H01H 59/0009* (2013.01); *H01H 2036/0093* (2013.01)

(58) Field of Classification Search
CPC ... H01H 2036/0093; H01H 2059/0063; H01H 2059/0027; H01H 59/00; H01H 59/0009; H03K 17/975; H02N 1/006; H02N 1/008
See application file for complete search history.

(56) References Cited

U.S. PATENT DOCUMENTS

| 5,268,696 | A | * | 12/1993 | Buck .................... H01Q 13/085 |
| | | | | 200/181 |
| 2006/0147027 | A1 | * | 7/2006 | Rauh .................. H01H 59/0009 |
| | | | | 379/279 |

(Continued)

FOREIGN PATENT DOCUMENTS

| JP | 2009-219266 A | 9/2009 |
| JP | 2011-040304 A | 2/2011 |

OTHER PUBLICATIONS

International Search Report and Written Opinion of PCT Application No. PCT/JP2015/086556, dated Mar. 22, 2016, 01 pages of English Translation and 06 pages of ISRWO.

*Primary Examiner* — Harry R Behm
(74) *Attorney, Agent, or Firm* — Chip Law Group

(57) ABSTRACT

An electrostatic actuator, including a base section, a movable electrode section to be displaceable in a predetermined direction with respect to the base section, and a plurality of fixed electrodes fixed to the base section to be separated from the movable electrode section along a movable direction of the movable electrode section and face the movable electrode section. Further, the plurality of fixed electrodes are electrically separated from each other. The electrostatic actuator is driven in accordance with a drive voltage selectively applied to the plurality of fixed electrodes and a voltage value of the drive voltage.

18 Claims, 18 Drawing Sheets

(56) References Cited

U.S. PATENT DOCUMENTS

| | | | |
|---|---|---|---|
| 2009/0001845 A1* | 1/2009 | Ikehashi | B81B 3/0021 |
| | | | 310/300 |
| 2009/0260960 A1 | 10/2009 | Gritters et al. | |
| 2009/0260961 A1* | 10/2009 | Luce | H01H 11/00 |
| | | | 200/181 |
| 2010/0001768 A1* | 1/2010 | Bezooijen | H04B 1/0458 |
| | | | 327/108 |
| 2010/0237929 A1* | 9/2010 | Ikehashi | H02M 3/07 |
| | | | 327/434 |
| 2012/0007527 A1* | 1/2012 | Miyano | H02N 1/006 |
| | | | 318/116 |

\* cited by examiner

ELECTROSTATIC ACTUATOR, SWITCH DEVICE AND POWER SUPPLY DEVICE

CROSS REFERENCE TO RELATED APPLICATIONS

This application is a U.S. National Phase of International Patent Application No. PCT/JP2015/086556 filed on Dec. 28, 2015, which claims priority benefit of Japanese Patent Application No. JP 2015-029472 filed in the Japan Patent Office on Feb. 18, 2015. Each of the above-referenced applications is hereby incorporated herein by reference in its entirety.

TECHNICAL FIELD

The present disclosure relates to an electrostatic actuator, a switch device, a power supply device, and a program.

BACKGROUND ART

Recently, research and development of sensor networks configured with a large number of information transmitting terminals equipped with sensors has advanced. An information transmitting terminal used in such a sensor network is required to be maintenance-free, and as one problem thereof, a battery-free configuration, that is, a configuration in which the information transmitting terminal is equipped with a power supply source such as a power generator and a battery is unnecessary, is necessary.

As an example of a technique for implementing the battery free configuration, research and development of a technology called energy harvesting, that is, a technology of collecting energy, such as sunlight, illumination light, a vibration generated by a machine, or heat, and obtaining electric power therefrom is under way.

CITATION LIST

Patent Literature

Patent Literature 1: JP 2009-219266A

DISCLOSURE OF INVENTION

Technical Problem

In energy harvesting technology, the amount of energy collected from a surrounding environment is mostly very small, and the collected energy (electric power) is stored in, for example, a power storage section such as a capacitor or a storage battery and used after a usable amount (for example, an electric power amount capable of driving a sensor or the like) is stored. For this reason, in a power supply device using the energy harvesting technology, for example, it is detected whether or not electric power stored in a power storage section has reached the usable amount, and the electric power stored in the power storage section is supplied to an information transmitting terminal in accordance with a detection result to drive the information transmitting terminal.

For example, in Patent Literature 1, a power supply device in which power consumption is further suppressed using an electric field detection type switch is disclosed as an example of a mechanism for detecting whether or not electric power stored in a power storage section has reached the usable amount and outputting the electric power in accordance with the detection result.

On the other hand, in the power supply device disclosed in Patent Literature 1, it is difficult to set a plurality of different threshold values as a threshold value (that is, a pull-in voltage) of a drive voltage for driving the electric field detection type switch. For this reason, for example, in a situation in which the information transmitting terminal is switched between a plurality of purposes having different necessary electric powers and used, it is necessary to set the threshold value in accordance with a purpose having higher necessary electric power, and thus it may be difficult to efficiently supply electric power.

In this regard, the present disclosure proposes an electrostatic actuator, a switch device, a power supply device, and a program which are capable of selectively switching the threshold value of the drive voltage.

Solution to Problem

According to the present disclosure, there is provided an electrostatic actuator, including: a base section; a movable electrode section held to be displaceable in a predetermined direction with respect to the base section; and a plurality of fixed electrodes fixed to the base section to be separated from the movable electrode section along a movable direction of the movable electrode section and face the movable electrode section, the plurality of fixed electrodes being electrically separated from each other. The electrostatic actuator is driven in accordance with a drive voltage selectively applied to the plurality of fixed electrodes and a voltage value of the drive voltage.

Further, according to the present disclosure, there is provided a switch device, including: a base section; a movable electrode section held to be displaceable in a predetermined direction with respect to the base section; and a plurality of fixed electrodes fixed to the base section to be separated from the movable electrode section along a movable direction of the movable electrode section and face the movable electrode section, the plurality of fixed electrodes being electrically separated from each other. Switching between a conduction state and a non-conduction state between different terminals is performed in accordance with a drive voltage selectively applied to the plurality of fixed electrodes and a voltage value of the drive voltage.

Further, according to the present disclosure, there is provided a power supply device, including: a storage capacitor connected to an input section in parallel; a supply control switch configured to include a movable electrode section held to be displaceable in a predetermined direction with respect to a base section and a plurality of fixed electrodes fixed to the base section to be separated from the movable electrode section along a movable direction of the movable electrode section and face the movable electrode section, the plurality of fixed electrodes being electrically separated from each other, and switch a connection relation between the storage capacitor and an output section between a conduction state and a non-conduction state; and a control section configured to switch a fixed electrode to which a drive voltage for driving the supply control switch is applied among the plurality of fixed electrodes. The supply control switch switches the connection relation in accordance with the drive voltage selectively applied to the plurality of fixed electrodes and a voltage value of the drive voltage.

Further, according to the present disclosure, there is provided a program causing a power supply device, which includes a storage capacitor connected to an input section in parallel, and a supply control switch configured to include a movable electrode section held to be displaceable in a predetermined direction with respect to a base section and a plurality of fixed electrodes fixed to the base section to be separated from the movable electrode section along a movable direction of the movable electrode section and face the movable electrode section, the plurality of fixed electrodes being electrically separated from each other, and switch a connection relation between the storage capacitor and an output section between a conduction state and a non-conduction state, to execute: selectively switching a fixed electrode to which a drive voltage for driving the supply control switch is applied among the plurality of fixed electrodes; and switching the connection relation in accordance with the drive voltage selectively applied to the plurality of fixed electrodes and a voltage value of the drive voltage.

Advantageous Effects of Invention

As described above, according to the present disclosure, an electrostatic actuator, a switch device, a power supply device, and a program which are capable of selectively switching a threshold value of a drive voltage are provided.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
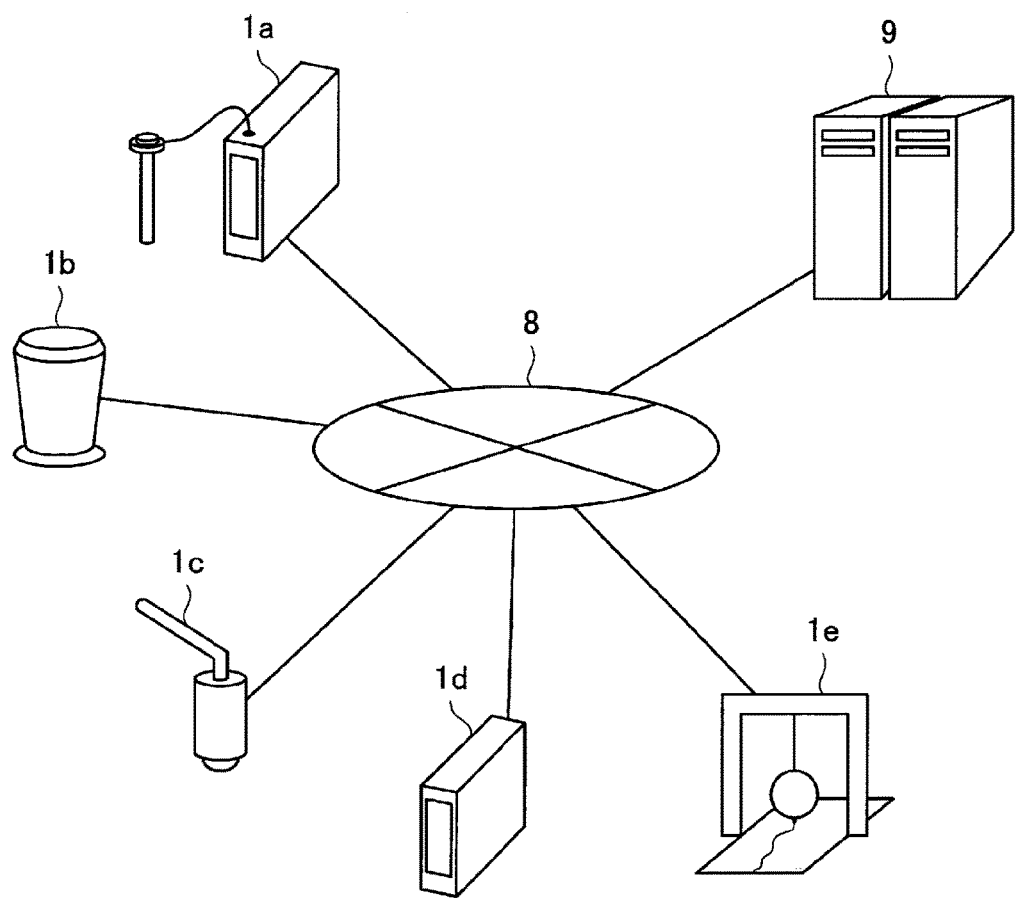
FIG. 1 is an explanatory diagram for describing an overview of a sensor network.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will proceed in the following order.
1. Overview
1.1. Sensor Network
1.2. Comparative Example: Exemplary Configuration of Information Transmitting Terminal
1.3. Description of Problems
2. Switch Device and Electrostatic Actuator
2.1. Exemplary Configurations of Switch Device and Electrostatic Actuator
2.2. Modified Examples
3. Information Transmitting Terminal
3.1. First Example
3.1.1. Configuration of Information Transmitting Terminal
3.1.2. Operation of Information Transmitting Terminal
3.1.3. Control Timing of Switch Device
3.2. Second Example
3.2.1. Configuration of Information Transmitting Terminal
3.1.2. Operation of Information Transmitting Terminal
4. Conclusion

1. OVERVIEW

First, in order to facilitate understanding of features of a power supply device according to the present disclosure, an overview of a sensor network and an example of a configuration of an information transmitting terminal used in the sensor network (particularly, a configuration of a power supply device used in the information transmitting terminal) will be described.

1.1. Sensor Network

For example, FIG. 1 is an explanatory diagram for describing an overview of a sensor network. For example, as illustrated in FIG. 1, the sensor network is configured such that a server 9 and a plurality of information transmitting terminals 1a to 1e equipped with various kinds of sensors are connected via a network 8.

A form of the network 8 is not limited as long as the network is a network that connects different devices such as the Internet, a leased line, a Local Area Network (LAN), or a Wide Area Network (WAN). The network 8 may be configured as a wired or wireless network. Further, the network 8 may include a plurality of networks or may include both a wireless network and a wired network.

For example, each of the information transmitting terminals 1a to 1e includes a sensor according to a purpose thereof and transmits information detected by the sensor to the server 9 via the network 8. Accordingly, various kinds of information detected by the information transmitting terminals 1a to 1e are aggregated in the server 9. Further, the information transmitting terminals 1a to 1e may be configured to collect information indicating various kinds of environments or various kinds of situations in conjunction with each other via the network 8.

On the other hand, in the sensor network described above with reference to FIG. 1, as a size thereof increases, the number of information transmitting terminals 1a to 1e used in the sensor network tends to increase. For this reason, the information transmitting terminals 1a to 1e used in the sensor network are required to be maintenance-free, and as one problem thereof, a battery-free configuration, that is, a configuration in which an information transmitting terminal is equipped with a power supply source (that is, a power generator) and a battery is unnecessary, is necessary.

As an example of a technology for implementing the battery-free configuration, a technology called energy harvesting ("energy harvesting") of collecting energy such as sunlight, illumination light, a vibration generated by a machine, or heat and obtaining electric power therefrom is known.

In the energy harvesting technology, the amount of energy collected from a surrounding environment is mostly very small, and the collected energy (electric power) is stored in, for example, a power storage section such as a capacitor or a storage battery and used after a usable amount (for example, an electric power amount capable of driving a sensor or the like) is stored. For this reason, in a power supply device using the energy harvesting technology, for example, it is detected whether or not electric power stored in a power storage section has reached the usable amount, and the electric power stored in the power storage section is supplied to an information transmitting terminal in accordance with a detection result to drive the information transmitting terminal.

Figure 2:
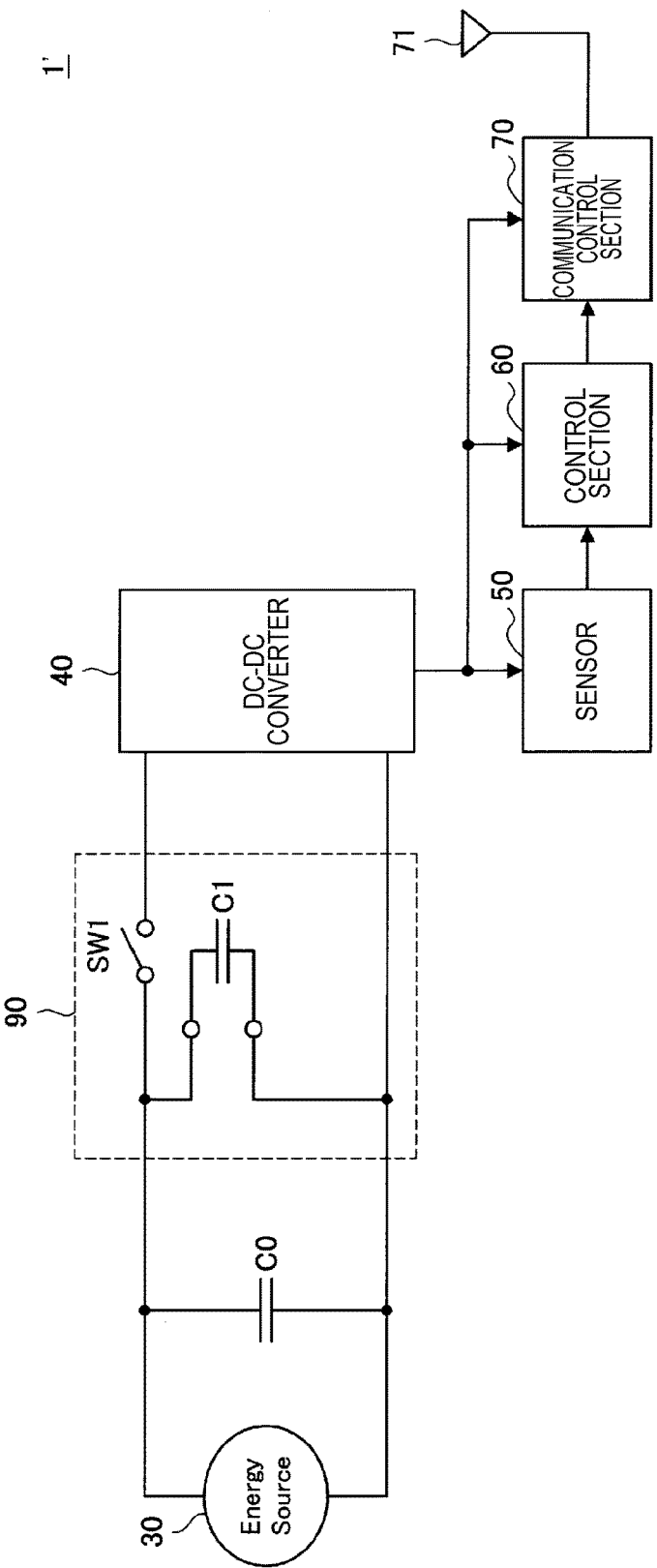
FIG. 2 is an explanatory diagram for describing an example of a functional configuration of an information transmitting terminal according to a comparative example.

1.2. Comparative Example: Exemplary Configuration of Information Transmitting Terminal Next, an example of an information transmitting terminal used in a sensor network will be described with reference to FIG. 2 as a comparative example. FIG. 2 is an explanatory diagram for describing an example of a functional configuration of the information transmitting terminal according to the comparative example, and illustrates functional configurations of a power supply device using the energy harvesting technology and an information transmitting terminal using the power supply device as a power supply source. In the following description, the power supply device is assumed to be installed in the information transmitting terminal.

As illustrated in FIG. 2, an information transmitting terminal 1' according to the comparative example includes a power supply source 30, a storage capacitor C0, a switch device 90, a DC-DC converter 40, a sensor 50, a control section 60, a communication control section 70, and a communication section 71.

In FIG. 2, the power supply source 30, the storage capacitor C0, the switch device 90, and the DC-DC converter 40 correspond to an example of a power supply device. Further, the sensor 50, the control section 60, the communication control section 70, and the communication section 71 correspond to an example of a configuration which operates as an information transmitting terminal.

The power supply source 30 is a component that collects energy from a surrounding environment on the basis of the energy harvesting technology, converts the collected energy into electric power, and outputs the electric power. The power supply source 30 may be configured with, for example, a generator that collects energy such as sunlight, illumination light, a vibration generated by a machine, or heat and converts the energy into electric power.

As illustrated in FIG. 2, the power supply source 30, the storage capacitor C0, the switch device 90, and the DC-DC converter 40 are connected in the described order. Specifically, the power supply source 30 and the storage capacitor C0 are connected in parallel, and the storage capacitor C0 and the DC-DC converter 40 are connected via the switch device 90. In other words, when the switch device 90 is in a conduction state, the power supply source 30 and the storage capacitor C0 are electrically connected to the DC-DC converter 40. Further, when the switch device 90 is in a non-conduction state, the electrical connection of the power supply source 30 and the storage capacitor C0 with the DC-DC converter 40 is disconnected.

Through this configuration, when the switch device 90 is in the non-conduction state, the electric power supplied from the power supply source 30 is stored in the storage capacitor C0. Thereafter, when the switch device 90 is switched to the conduction state, the electric power stored in the storage capacitor C0 is supplied to the DC-DC converter 40 via the switch device 90.

Figure 3:
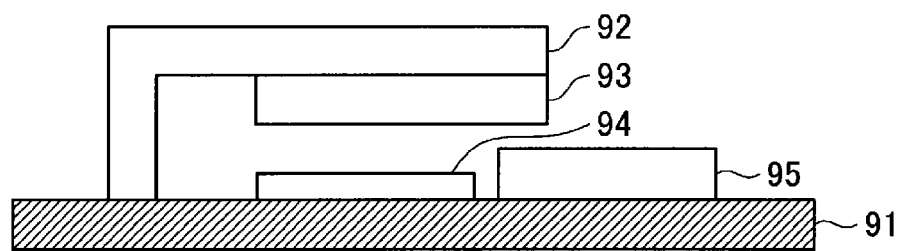
FIG. 3 is an explanatory diagram for describing an example of a configuration of a switch device according to the comparative example.

Here, an example of a configuration of the switch device 90 will be described with reference to FIG. 3. FIG. 3 is an explanatory diagram for describing an example of the configuration of the switch device 90 and illustrates an example of the switch device 90 configured as an electric field detection type switch.

As illustrated in FIG. 3, the switch device 90 configured as the electric field detection type switch includes an insulating substrate 91, an elastic body 92, and electrodes 93 to 95.

The electrode 93 is connected to the storage capacitor C0 side illustrated in FIG. 2 and held by the elastic body 92. Further, the electrode 95 is connected to the DC-DC converter 40 side illustrated in FIG. 2. Further, for example, the electrode 94 is connected to a reference potential and set to a predetermined potential. The elastic body 92, the electrode 94, and the electrode 95 are fixed to the common insulating substrate 91, and a hollow structure is formed between the electrodes. At this time, the elastic body 92 applies an elastic force to perform biasing in a direction which separates the electrode 93 from the electrode 94.

When the electric power supplied from the power supply source 30 is stored in the storage capacitor C0, a potential difference occurs between the electrode 93 and the electrode 94 in accordance with the stored electric power. Accordingly, an electric field according to the potential difference is generated between the electrode 93 and the electrode 94, and the electrode 93 and the electrode 94 attract each other due to the Coulomb force.

Strength of the electric field between the electrode 93 and the electrode 94 increases as a voltage value of the electric power stored in the storage capacitor C0 increases, and an attractive force (that is, the Coulomb force) between the electrode 93 and the electrode 94 increases as the strength of the electric field increases. Then, when the attractive force between the electrode 93 and the electrode 94 exceeds a force of the elastic force of the elastic body 92 separating the electrode 93 and the electrode 94, the elastic body 92 is flexed such that the electrode 93 and the electrode 95 come into contact with each other, and thus the electrode 93 and the electrode 95 are electrically connected to each other. Accordingly, an electric current flows from the storage capacitor C0 to the DC-DC converter 40 via the contact of the electrode 93 and the electrode 95 of the switch device 90. In other words, the switch device 90 enters the conduction state, and the electric power is supplied from the storage capacitor C0 to the DC-DC converter 40 via the switch device 90. In the following description, a voltage when the attractive force between the electrode 93 and the electrode 94 exceeds the force of the elastic force of the elastic body 92 separating the electrode 93 and the electrode 94 and the electrode 93 and the electrode 95 are electrically connected is also referred to as a "pull-in voltage."

As the electric power is supplied from the storage capacitor C0 to the DC-DC converter 40, the electric power stored in the storage capacitor C0 decreases and the voltage value of the electric power decreases, and thus the attractive force between the electrode 93 and the electrode 94 decreases. Then, when the attractive force between the electrode 93 and the electrode 94 is smaller than the force of the elastic force of the elastic body 92 separating the electrode 93 and the electrode 94, the electrode 93 and the electrode 95 are separated by the elastic force and the electrical connection between the electrode 93 and the electrode 95 is disconnected. In the following description, a voltage when the attractive force between the electrode 93 and the electrode 94 is smaller than the force of the elastic force of the elastic body 92 separating the electrode 93 and the electrode 94 and the electrical connection between the electrode 93 and the electrode 95 is disconnected by the elastic force is also referred to as a "pull-out voltage."

A capacitor C1 in the switch device 90 illustrated in FIG. 2 schematically illustrates the electrodes 93 and 94 illustrated in FIG. 3. Further, a switch section SW1 in the switch device 90 illustrated in FIG. 2 schematically illustrates a switch configured with the elastic body 92, the electrode 93, and the electrode 95 illustrated in FIG. 3.

For example, the switch device 90 illustrated in FIG. 3 may be configured as a device integrated on a substrate on the basis of a so-called Micro Electro Mechanical Systems (MEMS) technology.

Here, another configuration of the information transmitting terminal 1' will be described with reference again to FIG. 2. The DC-DC converter 40 is supplied with the electric power stored in the storage capacitor C0 and transforms the voltage value of the electric power in accordance with an operation voltage of each of the sensor 50, the control section 60, and the communication control section 70. Then, the DC-DC converter 40 supplies the transformed electric power to the sensor 50, the control section 60, and the communication control section 70. Accordingly, the sensor 50, the control section 60, and the communication control section 70 can be driven on the basis of the electric power supplied from the DC-DC converter 40.

The sensor 50 corresponds to a device for detecting various kinds of information. Various kinds of sensors such as a temperature sensor, a humidity sensor, a vibration sensor, a water level sensor, a rainfall sensor, and the like can be appropriately applied in accordance with a purpose as the sensor 50. It will be appreciated that the above-described example of the sensor 50 is merely an example, and the configuration of the sensor 50 is not limited thereto.

The sensor 50 is driven on the basis of the electric power supplied from the DC-DC converter 40, detects various kinds of information, and outputs data indicating the detection result to the control section 60.

The communication section 71 corresponds to a communication device that enables the information transmitting terminal 1' to communicate with an external device (for example, the server 9 in FIG. 1) via the network.

The communication section 71 is a wireless communication interface for implementing communication based on a communication standard such as Bluetooth (registered trademark) or Wi-Fi (registered trademark). The communication section 71 may include a communication antenna, a radio frequency (RF) circuit, a baseband processor, and the like. As another example, the communication section 71 may be configured as a wired communication interface.

The communication control section 70 is a component that controls communication between the information transmitting terminal 1' and an external device (for example, the server 9 in FIG. 1) via the network. The communication control section 70 is driven on the basis of the electric power supplied from the DC-DC converter 40 and controls an operation of the communication section 71.

Specifically, the communication control section 70 establishes a network with the external device by executing a predetermined communication sequence with the external device on the basis of an instruction given from the control section 60. When the network with the external device is established, the communication control section 70 supplies the electric power to the communication section 71, drives the communication section 71, and causes the communication section 71 to transmit the data output from the control section 60 to the external device via the established network.

The control section 60 is a component that is driven on the basis of the electric power supplied from the DC-DC converter 40 and controls various kinds of operations of the information transmitting terminal 1'. For example, the control section 60 may be configured as a so-called microcomputer. Further, the control section 60 may be configured with a processor such as a Central Processing Unit (CPU), a Graphics Processing Unit (GPU), a Digital Signal Processor (DSP), a System on Chip (SoC), or the like.

In the example illustrated in FIG. 2, the control section 60 acquires the detected data from the sensor 50, and controls the operation of the communication control section 70 such that the communication control section 70 transmits the data to the external device.

Figure 4:
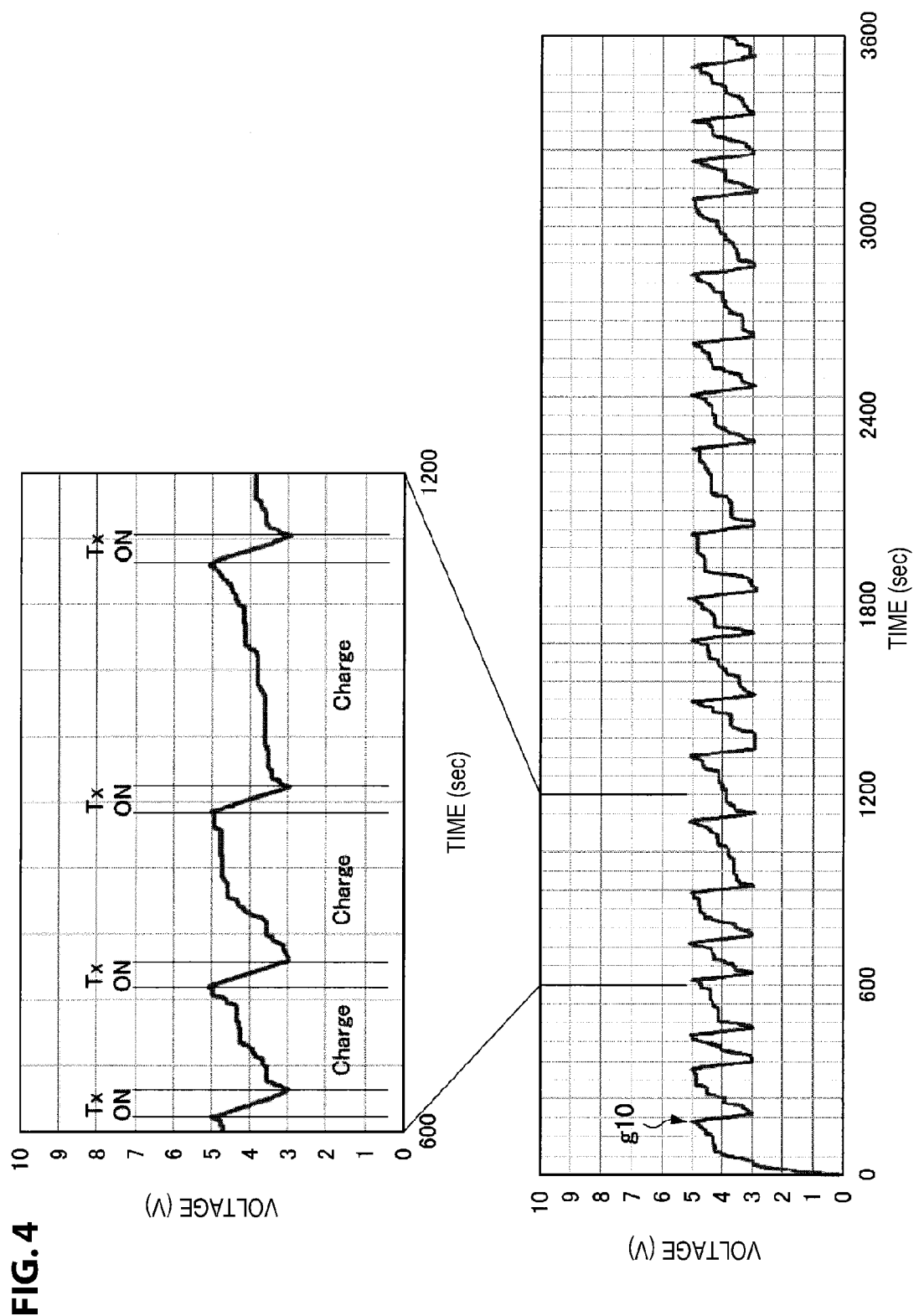
FIG. 4 is an explanatory diagram for describing an example of an operation of an information transmitting terminal according to the comparative example.

Here, an example of the operation of the information transmitting terminal 1' according to the comparative example illustrated in FIG. 2 will be particularly described with reference to FIG. 4 focusing on a change in the voltage value of the electric power stored in the storage capacitor C0. FIG. 4 is an explanatory diagram for describing an example of the operation of the information transmitting terminal 1' according to the comparative example, and illustrates an example of a temporal change of the voltage value of the electric power stored in the storage capacitor C0. In other words, in FIG. 4, the horizontal axis indicates a time (sec), and the vertical axis indicates a voltage value (V) of the electric power stored in the storage capacitor C0.

In an initial state, the switch device 90 is in the non-conduction state, and the electric power supplied from the power supply source 30 is stored in the storage capacitor C0 over time. Accordingly, the voltage value of the electric power stored in the storage capacitor C0 increases over time.

Then, when the voltage value of the electric power stored in the storage capacitor C0 reaches (or exceeds) a pull-in voltage (that is, a predetermined threshold value) of the switch device 90, the switch device 90 is controlled to enter the conduction state. For example, in the example illustrated in FIG. 4, the switch device 90 is adjusted so that the pull-in voltage is 5 (V).

When the switch device 90 enters the conduction state, the electric power stored in the storage capacitor C0 is supplied to the DC-DC converter 40. The DC-DC converter 40 transforms the voltage value of the electric power supplied from the storage capacitor C0 and supplies the transformed electric power to the sensor 50, the control section 60, and the communication control section 70. Accordingly, the sensor 50, the control section 60, and the communication control section 70 are driven, and information detected by the sensor 50 is transmitted to the external device via the control section 60, the communication control section 70, and the communication section 71.

As the electric power is supplied from the storage capacitor C0 to the DC-DC converter 40, the electric power stored in the storage capacitor C0 decreases over time. Accordingly, the voltage value of the electric power stored in the storage capacitor C0 decreases over time.

Then, when the voltage value of the electric power stored in the storage capacitor C0 falls below a pull-out voltage (that is, a predetermined threshold value) of the switch device 90, the switch device 90 is controlled to enter the non-conduction state. For example, in the example illustrated in FIG. 4, the switch device 90 is adjusted so that the pull-out voltage is 3 (V).

When the switch device 90 enters the non-conduction state, the supply of the electric power from the storage capacitor C0 to the DC-DC converter 40 is stopped. Accordingly, the supply of the electric power from the DC-DC converter 40 to the sensor 50, the control section 60, and the communication control section 70 is stopped, and the operations of the sensor 50, the control section 60, and the communication control section 70 are stopped. Further, since the supply of the electric power from the storage capacitor C0 to the DC-DC converter 40 is stopped, the storage of the electric power supplied from the power supply source 30 in the storage capacitor C0 is resumed.

Through the above configuration, the power supply device of the information transmitting terminal 1' according to the comparative example illustrated in FIG. 2 is able to perform control such that a small amount of energy collected from the surrounding environment is sequentially stored in the storage capacitor C0 as the electric power and the electric power is used after the usable amount is stored.

Further, in the power supply device of the information transmitting terminal 1' according to the comparative example, the switch device 90 of the electric field detection type switch is applied as a component that switches an electrical connection relation between the storage capacitor C0 and the DC-DC converter 40. Through this configuration, the power supply device need not consume the electric power to detect whether or not the electric power stored in the storage capacitor C0 reaches the usable amount. Therefore, the information transmitting terminal 1' according to the comparative example is able to efficiently use the electric power stored in the storage capacitor C0.

1.3. Description of Problems

On the other hand, the number of information transmitting terminals used in a sensor network tends to increase in accordance with a size of the sensor network, and the system is likely to be enlarged as the number of the information transmitting terminals increases, and thus its operation is likely to be complicated. For this reason, in order to implement a more efficient operation of the sensor network, there is a demand for implementation of a use form such that at least some of the information transmitting terminals are appropriately switched between a plurality of purposes.

On the other hand, when the information transmitting terminal 1' according to the comparative example is appropriately switched between a plurality of purposes and operated, it may be difficult to efficiently operate the information transmitting terminal 1'.

Specifically, in the information transmitting terminal 1' according to the comparative example, the threshold value (that is, the pull-in voltage) of the drive voltage for driving the switch device 90 configured with the electric field detection type switch is decided by the elastic force of the elastic body 92 illustrated in FIG. 3. In other words, in the information transmitting terminal 1' according to the comparative example, due to a structural characteristic of the switch device 90, only one pull-in voltage of the switch device 90 can be set.

For this reason, for example, in a situation in which the information transmitting terminal 1' according to the comparative example is appropriately switched between a plurality of purposes having different necessary electric powers, it is necessary to set the threshold value in accordance with a purpose having higher necessary electric power.

Through this configuration, even when the information transmitting terminal 1' is used for a purpose having lower necessary electric power, a drive start timing is delayed until electric power that enables the information transmitting terminal to be used for a purpose having higher necessary electric power is stored. In other words, when the information transmitting terminal 1' according to the comparative example is appropriately switched between a plurality of purposes having different necessary electric powers and used, overhead may occur in an electric power storage time, and the overhead increases as a difference between the necessary electric powers of purposes increases.

In order to cope with this problem, for example, a method of more efficiently operating the information transmitting terminal 1' through a configuration in which the pull-in voltage of the switch device 90 can be appropriately switched in accordance with a purpose is considered. In other words, when used for a purpose having lower necessary electric power, the pull-in voltage of the switch device 90 is set to be small in accordance with the purpose, and thus it is possible to immediately use the electric power when the voltage value of the stored electric power reaches the set pull-in voltage.

Figure 5:
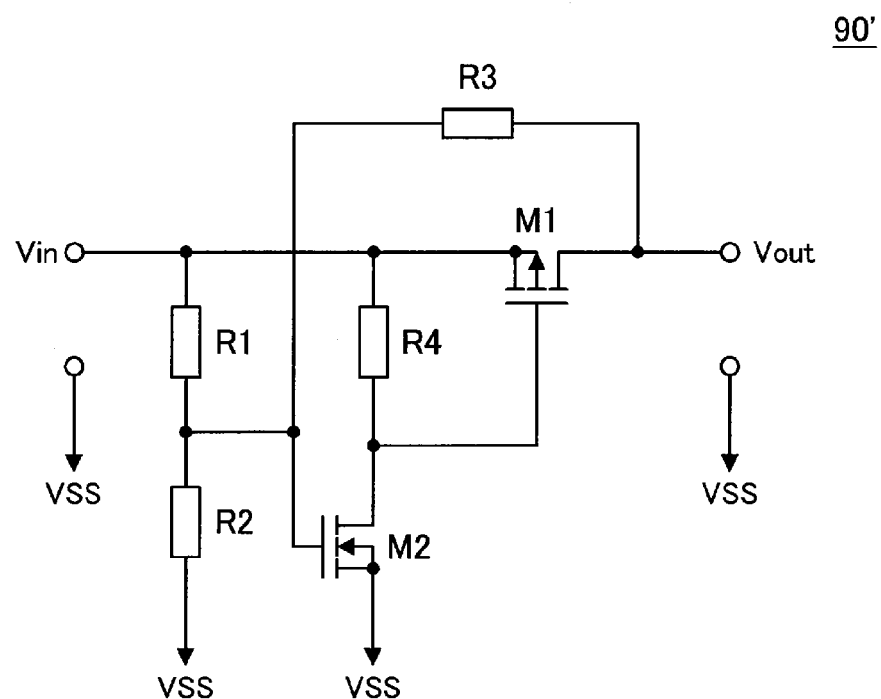
FIG. 5 is an example of a switch device configured to switch a pull-in voltage.

For example, FIG. 5 illustrates an example of a switch device configured so that a pull-in voltage thereof can be switched. A switch device 90' illustrated in FIG. 5 is an example of a switch device using a transistor and includes transistors M1 and M2 and resistors R1 to R4. In the example illustrated in FIG. 5, a p-channel metal-oxide-semiconductor field-effect transistor (MOSFET) is used as the transistor M1, and an n-channel MOSFET is used as the transistor M2.

In the transistor M1, a source terminal is connected to an input Vin side and a drain terminal is connected to an output Vout side. Further, a gate terminal of the transistor M1 is connected to a drain terminal of the transistor M2. The gate terminal and the source terminal of the transistor M1 are connected via the resistor R4.

In the transistor M2, a source terminal is connected to a reference potential VSS. A gate terminal of the transistor M2 is connected to the input Vin side via the resistor R1 and is connected to the output Vout side via the resistor R3.

Further, one terminal of the resistor R2 is connected to the gate terminal of the transistor M2 and connected to the input Vin via the resistor R1. Further, the other terminal of the resistor R2 is connected to the reference potential VSS.

Through this configuration, in the switch device 90' illustrated in FIG. 5, for example, at least one of the resistors R1 and R2 is configured to have a variable resistor value, and it is possible to change the pull-in voltage by dynamically changing a ratio between the resistors R1 and R2.

However, in the switch device 90' illustrated in FIG. 5, since electric current consistently flows through the resistors R1 and R2, the electric power is consumed. Particularly, when the electric power is supplied by the energy harvesting technology, the amount of energy (electric power) collected from the surrounding environment is mostly very small, and thus, storage efficiency of the electric power in the storage capacitor C0 is likely to decrease when the electric power is consumed by the switch device 90'.

In this regard, an information transmitting terminal pertaining to the present disclosure was made in light of the above-mentioned problems, and it is desirable to enable the threshold value (that is, pull-in voltage) of the drive voltage to be selectively switched and further suppress power consumption.

2. SWITCH DEVICE AND ELECTROSTATIC ACTUATOR

2.1. Exemplary Configurations of Switch Device and Electrostatic Actuator

Figure 6:
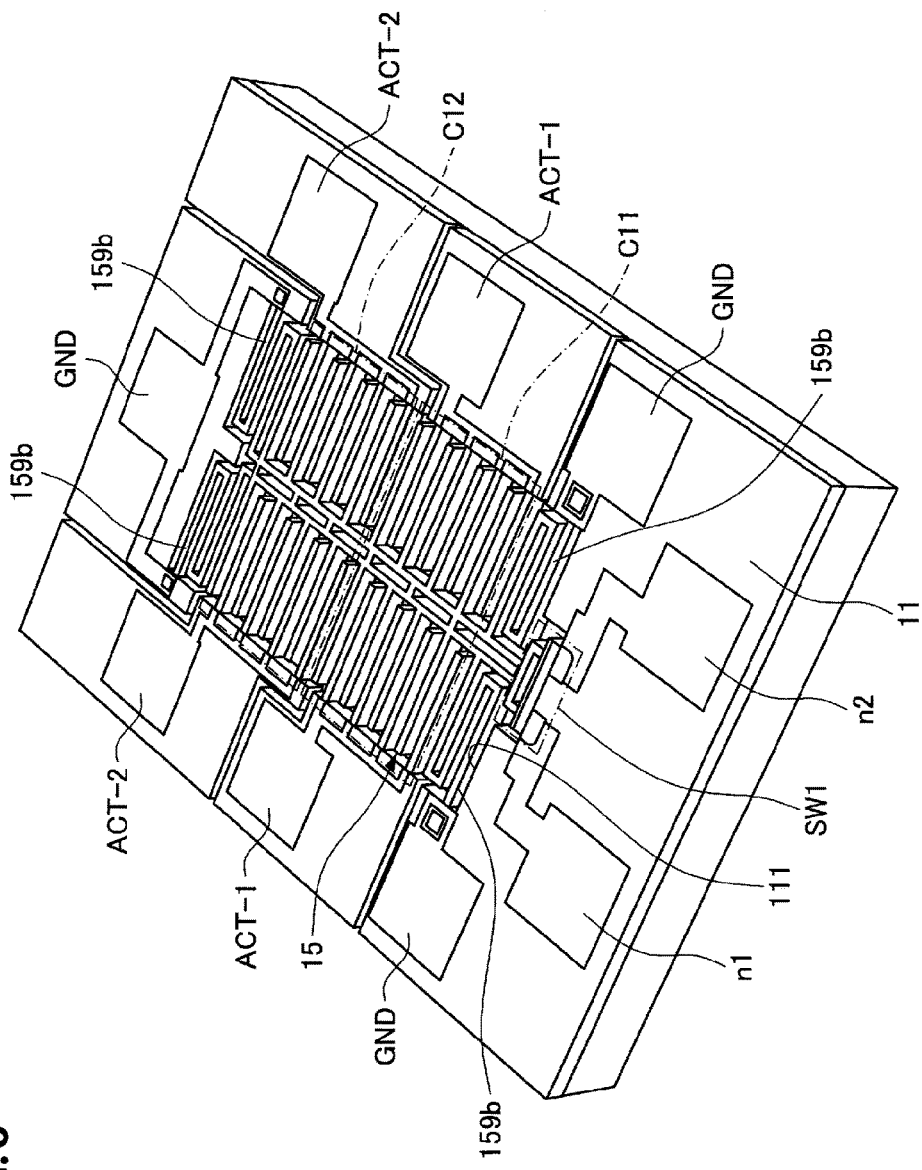
FIG. 6 is a schematic perspective view for describing an example of a configuration of a switch device according to an embodiment of the present disclosure.

First, an example of configurations of a switch device used in the information transmitting terminal according to the present embodiment and an electrostatic actuator used in the switch device will be described. For example, FIG. 6 is a schematic perspective view for describing an example of a configuration of a switch device according to the present embodiment. As illustrated in FIG. 6, a switch device 10 according to the present embodiment includes a base section 11, a switch section SW1, a movable electrode section 15, and terminals n1, n2, ACT-1, ACT-2, and GND. In the following description, in order to facilitate understanding of the configuration of the switch device 10 according to the present embodiment, for the sake of convenience, a plane direction of the base section 11 is referred to as an x direction and a y direction, and a vertical direction is referred to as a z direction. In other words, the x direction and the y direction are assumed to be orthogonal to each other, and the z direction is assumed to be orthogonal to both the x direction and the y direction.

The base section 11 is formed of an insulating material, and an opening section 111 is provided near the center of a plane formed along the x direction and the y direction. On a one end portion side of the base section 11 in the y direction, the terminals n1 and n2 are provided to be separated from each other. Further, portions of terminals n1 and n2 are exposed in a portion of the inside surface of the opening section 111 (that is, a portion of the inside surface of one end portion side in the y direction).

Further, in the opening section 111, the movable electrode section 15 is held to be displaceable along the y direction. On a side of the end portions of the movable electrode section 15 along the y direction which faces the terminals n1 and n2 exposed in the inside surface of the opening section 111, the switch section SW1 having conductivity is provided.

Figure 7:
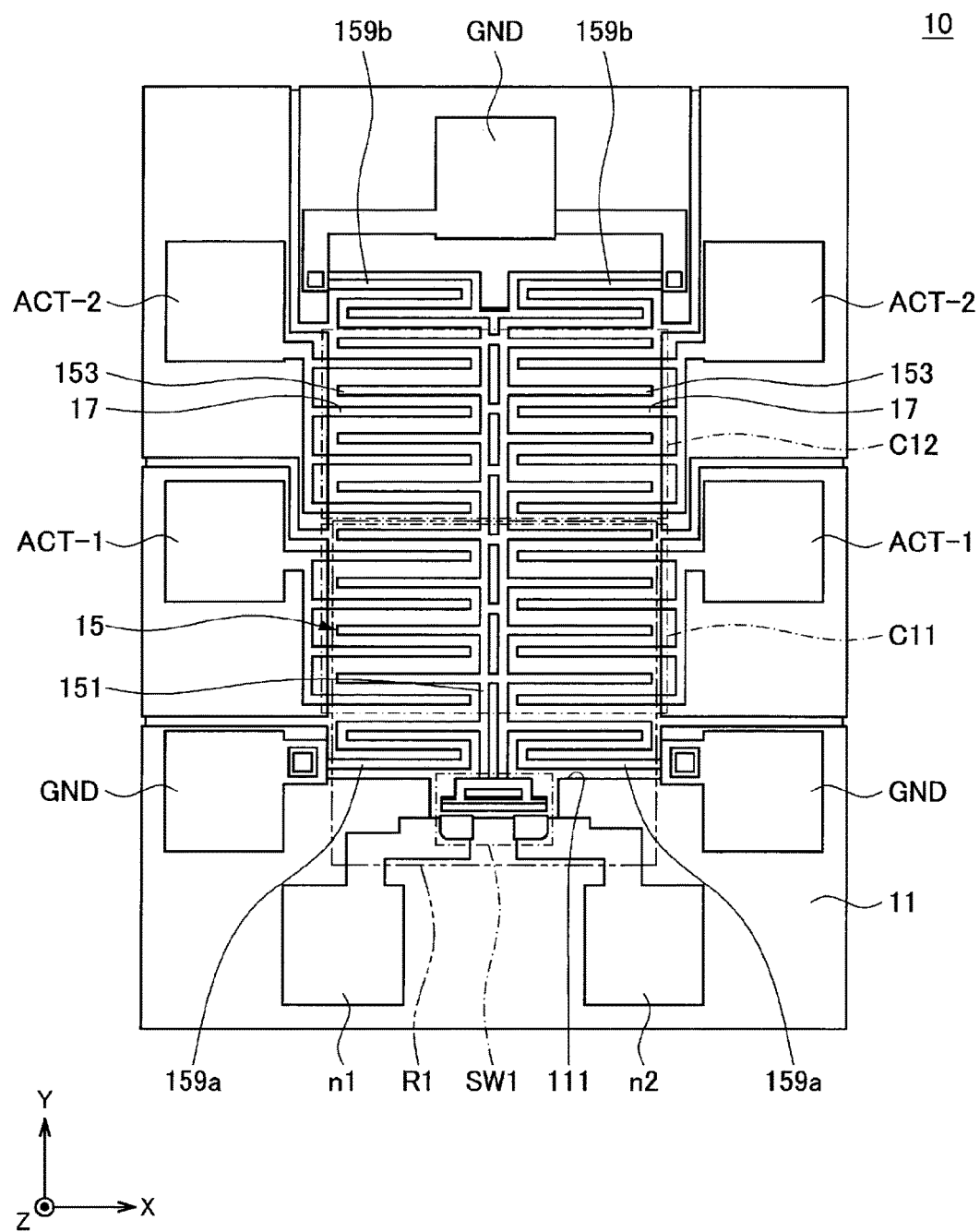
FIG. 7 is a schematic plane view of the switch device illustrated in FIG. 6.

Here, FIG. 7 is referred to. FIG. 7 is a schematic plane view when the switch device 10 illustrated in FIG. 6 is viewed in the z direction (from the top). In the following description, for the sake of convenience, an upward direction in FIG. 7 is referred to as a +y direction, a downward direction is referred to as a −y direction, a rightward direction is referred to as a +x direction, and a leftward direction is referred to as a −x direction.

On both end portions of the base section 11 along the y direction, the terminal GND connected to the reference potential is provided. A portion of each of the terminals GND is exposed in at least a portion of the inside surface of the opening section 111 on each end portion side in the y direction. For example, in the example illustrated in FIG. 7, parts of the terminals GND are exposed near both end portions in the y direction in the inside surface of the opening section 111 on the x direction side.

The movable electrode section 15 includes a shaft member 151, a plurality of electrode members 153, a switch section SW1, and elastic members 159a and 159b. The shaft member 151 is a long-length member having conductivity and is provided to extend along the y direction.

Both end portions of the shaft member 151 in the longitudinal direction (that is, the y direction) are suspended on the base section 11 by the elastic members 159a and 159b having conductivity.

Specifically, as illustrated in FIG. 7, one end portion of the elastic member 159a is connected to the end portion of the shaft member 151 on the −y direction side, and the other end portion is connected to the portion of the inside surface of the opening section 111 in which a portion of the terminal GND located on the −y direction side is exposed. At this time, the shaft member 151, the elastic member 159a, and the terminal GND located on the −y direction side are electrically connected to one another.

Similarly, one end portion of the elastic member 159b is connected to the end portion of the shaft member 151 on the +y direction side, and the other end portion is connected to the portion of the inside surface of the opening section 111 in which a portion of the terminal GND located on the +y direction side is exposed. At this time, the shaft member 151, the elastic member 159b, and the terminal GND located on the +y direction side are electrically connected to one another.

Further, the elastic members 159a and 159b apply the elastic force so that the shaft member 151 is biased along they direction in a direction (that is, the +y direction) away from the portion of the inside surface of the opening section 111 in which the terminals n1 and n2 are exposed.

Further, the switch section SW1 is provided on an end portion (that is, the −y direction side) on a side opposite to the direction in which the elastic members 159a and 159b biases the shaft member 151 out of the both end portions of the shaft member 151 in the longitudinal direction (that is, the y direction).

The switch section SW1 is provided on the end portion side of the shaft member 151 in the −y direction so that a portion thereof faces a portion of each of the terminals n1 and n2 exposed on the inside surface of the opening section 111. In the switch section SW1, the portion that faces a portion of each of the terminals n1 and n2 exposed on the inside surface of the opening section 111 has conductivity. The portion of the switch section SW1 having conductivity is provided to establish a connection between the terminal n1 and the terminal n2 when the shaft member 151 is displaced toward the terminals n1 and n2 (that is, the −y direction side) along the y direction.

In other words, as the shaft member 151 is displaced in the −y direction, the terminal n1 and the terminal n2 are electrically connected via the switch section SW1. A mechanism of displacing the shaft member 151 in the −y direction will be described later in detail.

Further, for example, when the shaft member 151 is displaced in the +y direction due to the elastic force of the elastic members 159a and 159b, the switch section SW1 separates the terminals n1 and n2 from each other and disconnects the electrical connection between the terminal n1 and the terminal n2 via the switch section SW1.

The portion of the switch section SW1 (that is, the portion having conductivity) facing the portion of each of the terminals n1 and n2 exposed on the inside surface of the opening section 111 is insulated from the shaft member 151. As a specific example, the switch section SW1 may be held to the end portion of the shaft member 151 on the −y direction side via an insulating material.

Further, a plurality of planar electrode members 153 are provided to extend from the end portion of the shaft member 151 in the short direction (the x direction) in a direction intersecting a direction in which the shaft member 151 extends along a direction (that is, the y direction) in which the shaft member 151 extends. For example, in the example illustrated in FIG. 7, each electrode member 153 is provided to extend from the shaft member 151 in both the +x direction and the −x direction. At this time, the electrode member 153 is provided such that the normal direction of the planar portion faces the direction (that is, the y direction) in which the shaft member 151 is displaced. The shaft member 151 and each electrode member 153 are electrically connected to each other.

At least some of the respective components of the movable electrode section 15 (that is, the shaft member 151, an electrode member 153, the switch section SW1, the elastic member 159a, and the elastic member 159b) may be integrally configured. Further, each terminal GND and the elastic members 159a and 159b may be integrally configured.

Further, on the end portion of the base section 11 in the x direction, a plurality of terminals having conductivity electrically separated from one another are provided along the y direction. In the example illustrated in FIG. 7, on both end portions of the base section 11 in the x direction, the terminals ACT-1 and ACT-2 are provided along the y direction.

A portion of the terminal ACT-1 is exposed in the opening section 111 from a portion of the inside surface of the opening section 111 located on the x direction side as a planar fixed electrode 17 and provided to extend toward the shaft member 151 of the variable electrode section 15 (that is, toward the other end side in the x direction). Hereinafter, the fixed electrode 17 provided so that a portion of the terminal ACT-1 extends is also referred to as a "fixed electrode 17 connected to the terminal ACT-1." It will be appreciated that the terminal ACT-1 and the fixed electrode 17 connected to the terminal ACT-1 are electrically connected to each other. Further, it is desirable that at least one fixed electrode 17 connected to the terminal ACT-1 be provided, and in the example illustrated in FIG. 7, a plurality of fixed electrodes 17 are provided along the y direction.

Similarly, a portion of the terminal ACT-2 is exposed in the opening section 111 from a portion of the inside surface of the opening section 111 located on the x direction side as a planar fixed electrode 17 and provided to extend toward the shaft member 151 of the variable electrode section 15 (that is, toward the other end side in the x direction). Hereinafter, the fixed electrode 17 provided so that a portion of the terminal ACT-2 extends is also referred to as a "fixed electrode 17 connected to the terminal ACT-2." It will be appreciated that the terminal ACT-2 and the fixed electrode 17 connected to the terminal ACT-2 are electrically connected to each other. Further, it is desirable that at least one fixed electrode 17 connected to the terminal ACT-2 be provided, and in the example illustrated in FIG. 7, a plurality of fixed electrodes 17 are provided along the y direction. Further, the fixed electrode 17 connected to the terminal ACT-1 and the fixed electrode 17 connected to the terminal ACT-2 are provided not to be electrically connected to each other.

Further, the fixed electrode 17 connected to the terminal ACT-1 is provided so that the planar portion of the fixed electrode 17 faces planar portions of some electrode members 153 among a plurality of electrode members 153 of the movable electrode section 15. For example, in the example illustrated in FIG. 7, the fixed electrode 17 connected to the terminal ACT-1 is provided to face some electrode members 153 among a plurality of electrode members 153 of the movable electrode section 15 along the y direction.

As will be described later in detail, in a state in which the movable electrode section 15 is not displaced along the y direction (that is, in a state in which it is held at a predetermined position by the elastic force of the elastic members 159a and 159b), the fixed electrode 17 connected to the terminal ACT-1 and the electrode member 153 facing the fixed electrode 17 are separated along the y direction.

Through this configuration, when the drive voltage is applied to the terminal ACT-1, a potential difference occurs between the fixed electrode 17 connected to the terminal ACT-1 and the electrode member 153 facing the fixed electrode 17 in accordance with the voltage value of the drive voltage, and an electric field according to the potential difference occurs. Accordingly, the attractive force (that is, the Coulomb force) is generated between the fixed electrode 17 and the electrode member 153, and the attractive force acts on the fixed electrode 17 as force of displacing the movable electrode section 15 along the y direction.

In other words, when the drive voltage is applied to the terminal ACT-1, the fixed electrode 17 connected to the terminal ACT-1 and the electrode member 153 facing the fixed electrode 17 operate as an electrostatic actuator. Hereinafter, in FIG. 7, the electrostatic actuator which is indicated by reference numeral C11 and formed by the fixed electrode 17 connected to the terminal ACT-1 and the electrode member 153 facing the fixed electrode 17 is also referred to as an "electrostatic actuator C11."

Similarly, the fixed electrode 17 connected to the terminal ACT-2 is provided so that the planar portion of the fixed electrode 17 faces planar portions of some electrode members 153 among a plurality of electrode members 153 of the movable electrode section 15. For example, in the example illustrated in FIG. 7, the fixed electrode 17 connected to the terminal ACT-2 is provided to face some electrode members 153 among a plurality of electrode members 153 of the movable electrode section 15 along the y direction. Further, in the example illustrated in FIG. 7, the fixed electrode 17 connected to the terminal ACT-2 is provided to face another electrode member 153 which is different from the electrode member 153 facing the fixed electrode 17 connected to the terminal ACT-2 among a plurality of electrode members 153 of the movable electrode section 15.

Further, in a state in which the movable electrode section 15 is not displaced along the y direction (that is, in a state in which it is held at a predetermined position by the elastic force of the elastic members 159a and 159b), the fixed electrode 17 connected to the terminal ACT-2 and the electrode member 153 facing the fixed electrode 17 are separated along the y direction.

Through this configuration, when the drive voltage is applied to the terminal ACT-2, a potential difference occurs between the fixed electrode 17 connected to the terminal ACT-2 and the electrode member 153 facing the fixed electrode 17 in accordance with the voltage value of the drive voltage, and an electric field according to the potential difference occurs. Accordingly, the attractive force (that is, the Coulomb force) is generated between the fixed electrode 17 and the electrode member 153, and the attractive force acts on the fixed electrode 17 as force of displacing the movable electrode section 15 along the y direction.

In other words, when the drive voltage is applied to the terminal ACT-2, the fixed electrode 17 connected to the terminal ACT-2 and the electrode member 153 facing the fixed electrode 17 operate as an electrostatic actuator. Hereinafter, in FIG. 7, the electrostatic actuator which is indicated by reference numeral C11 and formed by the fixed electrode 17 connected to the terminal ACT-2 and the electrode member 153 facing the fixed electrode 17 is also referred to as an "electrostatic actuator C12."

Figure 8:
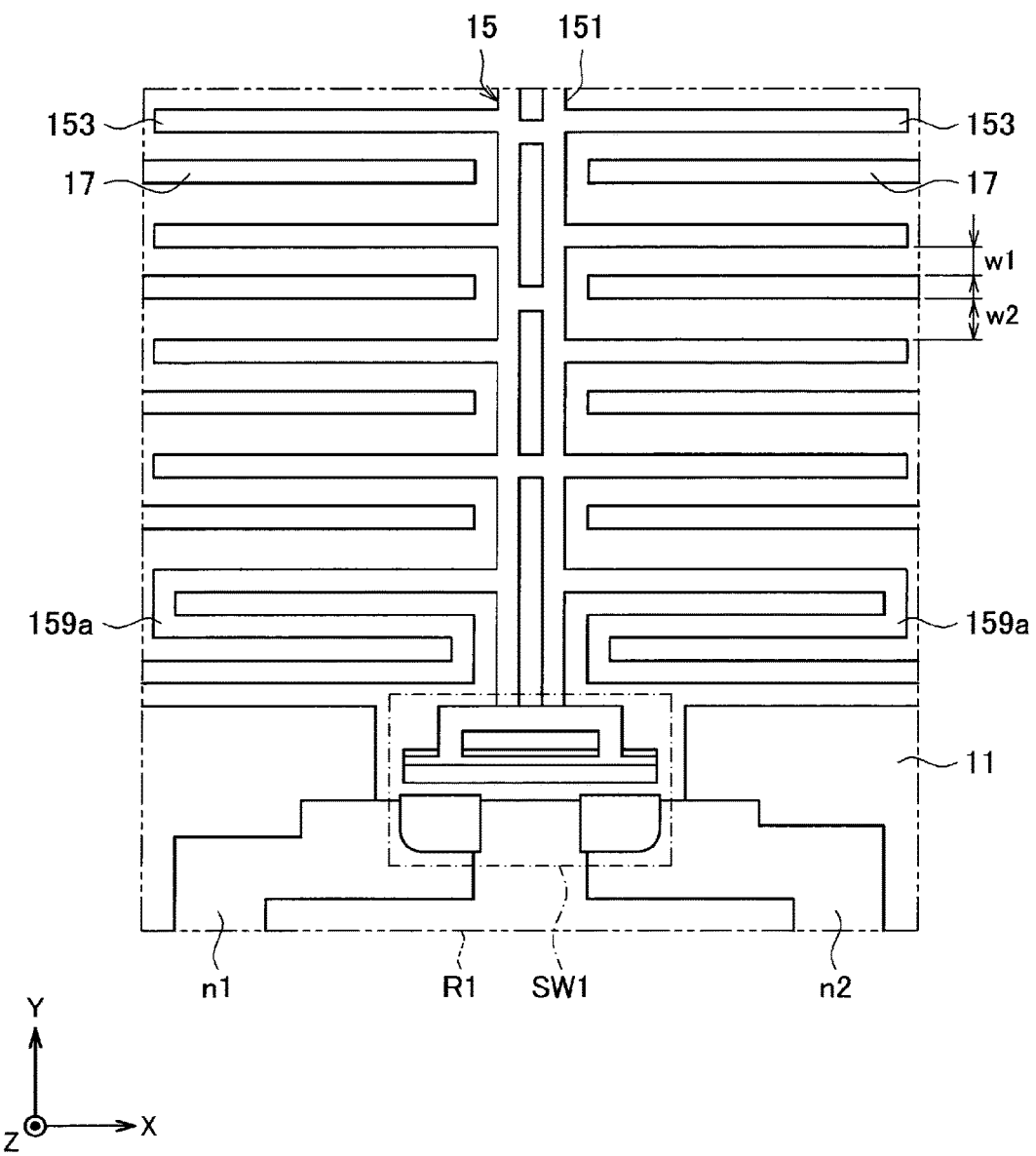
FIG. 8 is a schematic enlarged view of a part of FIG. 7.

Here, detailed configurations of the electrostatic actuators C11 and C12 will be described with reference to FIG. 8 using the case of the electrostatic actuator C11 as an example. FIG. 8 is a schematic enlarged view of a portion of FIG. 7, that is, an enlarged view of a portion near the electrostatic actuator C11 and switch section SW1 which is indicated by reference numeral R1 in FIG. 7.

As illustrated in FIG. 8, a plurality of fixed electrodes 17 provided along the y direction are provided to face each other between a plurality of electrode members 153 provided along the y direction in the movable electrode section 15.

Here, a distance between the fixed electrode 17 and the electrode member 153 positioned on the +y direction side with respect to the fixed electrode 17 is assumed to be w1. Further, a distance between the fixed electrode 17 and the electrode member 153 located on the −y direction side with respect to the fixed electrode 17 is assumed to be w2. At this time, in a state in which the movable electrode section 15 is not displaced along the y direction (that is, in a state in which it is held at a predetermined position by the elastic force of the elastic members 159a and 159b), the movable electrode section 15 is held so that a relation between the distance w1 and the distance w2 satisfies w1<w2.

Through this configuration, when the drive voltage is applied to the fixed electrode 17, and an electric field is generated between the fixed electrode 17 and the electrode member 153, an electric field stronger than the electric field generated in the −y direction side with respect to the fixed electrode 17 is generated on the +y direction side. Accordingly, the attractive force between the fixed electrode 17 and the electrode member 153 positioned on the +y direction side with respect to the fixed electrode 17 exceeds the attractive force between the fixed electrode 17 and the electrode member 153 positioned on the −y direction side with respect to the fixed electrode 17. In other words, the fixed electrode 17 and the electrode member 153 positioned on the +y direction side with respect to the fixed electrode 17 attract each other, so that the movable electrode section 15 is displaced in the −y direction.

The configurations of the movable electrode section 15 and the fixed electrode 17 illustrated in FIG. 8 are merely examples, and the configurations thereof are not limited as long as it is possible to perform control such that force of displacing the movable electrode section 15 towards the −y direction works when the drive voltage is applied to the fixed electrode 17. As a specific example, an insulator film may be formed on the −y direction side of the fixed electrode 17 so that no electric field is generated between the fixed electrode 17 and the electrode member 153 positioned on the −y direction side of the fixed electrode.

As another example, a dielectric may be interposed between the fixed electrode 17 and the electrode member 153 positioned on the +y direction side of the fixed electrode so that the electric field between the fixed electrode 17 and the electrode member 153 positioned on the +y direction side of the fixed electrode is stronger. In this case, it is desirable to provide the dielectric to the extent that the displacement of the movable electrode section 15 toward the −y direction is not disturbed (that is, so that the switch section SW1 comes in contact with the terminals n1 and n2 when the movable electrode section 15 is displaced toward the −y direction).

Further, as described above, the movable electrode section 15 is biased to be displaced in the +y direction by the elastic force of the elastic members 159a and 159b. In other words, the elastic force of the elastic members 159a and 159b acts as force for separating the fixed electrode 17 from the electrode member 153 positioned on the +y direction side with respect to the fixed electrode 17.

Here, when the voltage value of the drive voltage applied to the fixed electrode 17 increases, the attractive force (that is, Coulomb force) between the fixed electrode 17 and the electrode member 153 increases with the increase in the voltage value. Then, when the attractive force (that is, Coulomb force) between the fixed electrode 17 and the electrode member 153 positioned on the +y direction side with respect to the fixed electrode 17 exceeds the elastic force of the elastic members 159a and 159b, the movable electrode section 15 is displaced in the −y direction.

In other words, when the movable electrode section 15 is displaced in the −y direction, the portion of the switch section SW1 having conductivity comes into contact with the terminal n1 and the terminal n2, and establishes a connection between the terminal n1 and the terminal n2. Accordingly, the terminal n1 and the terminal n2 are electrically connected (that is, they enter the conduction state).

Further, when the voltage value of the drive voltage applied to the fixed electrode 17 decreases, the attractive force (that is, the Coulomb force) between the fixed electrode 17 and the electrode member 153 decreases with the decrease in the voltage value. Then, when the attractive force (that is, Coulomb force) between the fixed electrode 17 and the electrode member 153 positioned on the +y direction side with respect to the fixed electrode 17 is smaller than the elastic force of the elastic members 159a and 159b, the movable electrode section 15 is displaced in the +y direction by the elastic force.

In other words, when the movable electrode section 15 is displaced in the +y direction, the portion of the switch section SW1 contacting the terminal n1 and the terminal n2 is separated from the terminal n1 and the terminal n2. Accordingly, the electrical connection between the terminal n1 and the terminal n2 is disconnected (that is, they enter the non-conduction state).

Figure 9:
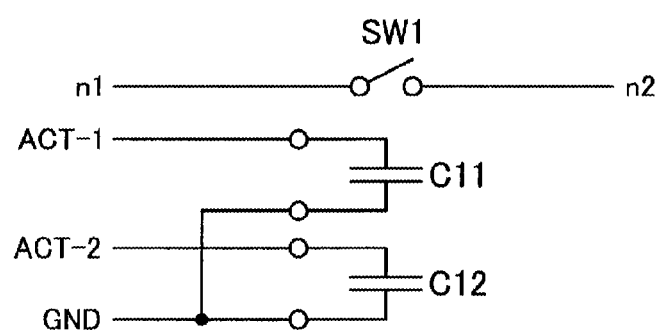
FIG. 9 is an explanatory diagram for describing a schematic circuit configuration of the switch device illustrated in FIG. 6 and FIG. 7.

Here, a circuit diagram of switch device 10 is schematically illustrated in FIG. 9. FIG. 9 is an explanatory diagram for describing a schematic circuit configuration of the switch device 10 and schematically illustrates an example of the circuit configuration of the switch device 10 illustrated in FIGS. 6 and 7.

As illustrated in FIGS. 7 and 9, the switch device 10 according to the present embodiment is configured such that the terminals ACT-1 and ACT-2 are electrically separated, and the drive voltage can be selectively applied to each of the terminals ACT-1 and terminal ACT-2. In other words, in the switch device 10 according to the present embodiment, it is possible to individually and independently drive each of the electrostatic actuators C11 and C12 which displace the common movable electrode section 15.

Through this configuration, for example, when the drive voltage is applied to both the terminals ACT-1 and ACT-2, both the electrostatic actuators C11 and C12 operate so that the common movable electrode section 15 is displaced in the −y direction. At this time, the number of sets of electrode member 153 and fixed electrode 17 attracted by Coulomb force increases to be larger than when the drive voltage is applied to only one of the terminals ACT-1 and ACT-2.

Therefore, when the drive voltage is applied to both the terminal ACT-1 and ACT-2, the force of displacing the movable electrode section 15 in the − direction is larger than when the drive voltage is applied to only one of the terminals ACT-1 and ACT-2. In other words, when the drive voltage is applied to both the terminal ACT-1 and ACT-2, it is possible to displace the movable electrode section 15 in the −y direction using the drive voltage having the smaller voltage value than when the drive voltage is applied to only one of the terminals ACT-1 and ACT-2.

In other words, the switch device 10 according to the present embodiment selectively switches the pull-in voltage that controls the switch section SW1 to enter the conduction state in accordance with a combination of terminals to which the drive voltage is selectively applied out of the terminals ACT-1 and ACT-2.

As described above, when the drive voltage is applied to the fixed electrode 17, the strength of the force by which the electrostatic actuators C11 and C12 displace the movable electrode section 15 in the −y direction corresponds to the strength of the Coulomb force working between the fixed electrode 17 and the electrode member 153. Therefore, each of the electrostatic actuators C11 and C12 is able to adjust the strength of the force of displacing the movable electrode section 15 towards the −y direction by adjusting the Coulomb force working between the fixed electrode 17 and the electrode member 153.

Specifically, it is possible to adjust the Coulomb force generated between the fixed electrode 17 and the electrode member 153 in accordance with an area of a portion in which the fixed electrode 17 and the electrode member 153 face each other. The area of the portion in which the fixed electrode 17 and the electrode member 153 face each other can be adjusted in accordance with, for example, the number of fixed electrodes 17 facing the electrode member 153. In other words, as the number of fixed electrodes 17 facing the electrode member 153 increases, the area of the portion in which the fixed electrode 17 and the electrode member 153 face each other increases, and the Coulomb force generated between the fixed electrode 17 and the electrode member 153 further increases with the increase in the area.

As another example, it is also possible to adjust the Coulomb force generated between the fixed electrode 17 and the electrode member 153 in accordance with a distance between the fixed electrode 17 and the electrode member 153 which face each other. Specifically, as the distance between the fixed electrode 17 and the electrode member 153 which face each other decreases, the Coulomb force generated between the fixed electrode 17 and the electrode member 153 further increases.

It will be appreciated that the above example is merely an example, and the method is not particularly limited as long as it is possible to adjust the Coulomb force generated between the fixed electrode 17 and the electrode member 153 by applying the drive voltage to the fixed electrode 17. For example, the dielectric may be interposed between the fixed electrode 17 and the electrode member 17 to adjust the Coulomb force generated between the fixed electrode 17 and the electrode member 153.

Further, in the example illustrated in FIG. 7, the fixed electrodes 17 connected to the terminal to which the common drive voltage is applied are arranged to be symmetrical in the x axis direction with respect to the shaft member 151. As a specific example, the fixed electrodes 17 connected to the terminal ACT-1 are arranged to be symmetrical in the x axis direction with respect to the shaft member 151. Similarly, the fixed electrodes 17 connected to the terminal ACT-2 are arranged to be symmetrical in the x axis direction with respect to the shaft member 151.

Through this configuration, when the drive voltage is applied to at least one of terminal ACT-1 and ACT-2, the forces that are generated on both the +x direction side and the −x direction side with respect to shaft member 151 and displace the movable electrode section 15 in the −y direction compete with each other. Thus, when the movable electrode section 15 is displaced in the −y direction, it is possible to prevent the occurrence of torsion and cause the switch section SW1 to be reliably brought into contact with both of the terminals n1 and n2.

An example of the configurations of the switch device 10 used in the information transmitting terminal according to the present embodiment and the electrostatic actuator used in the switch device 10 has been described above with reference to FIGS. 6 to 9.

Further, for example, when the switch device 10 is driven by a low drive voltage of several tens of volts or less, the Coulomb force generated between the fixed electrode 17 and the electrode member 153 tends to decrease in accordance with the voltage of the drive voltage. Therefore, in order to obtain a desired magnitude of the Coulomb force, it is desirable to decrease the distance between the fixed electrode 17 and the electrode member 153 as small as possible. In order to implement such a configuration, for example, the switch device 10 may be configured as a device integrated on a substrate on the basis of a so-called MEMS technology.

2.2. Modified Examples

Next, examples of the configuration of the switch device 10 according to one embodiment of the present disclosure will be described as modified examples.

(First Modified Example)

Figure 10:
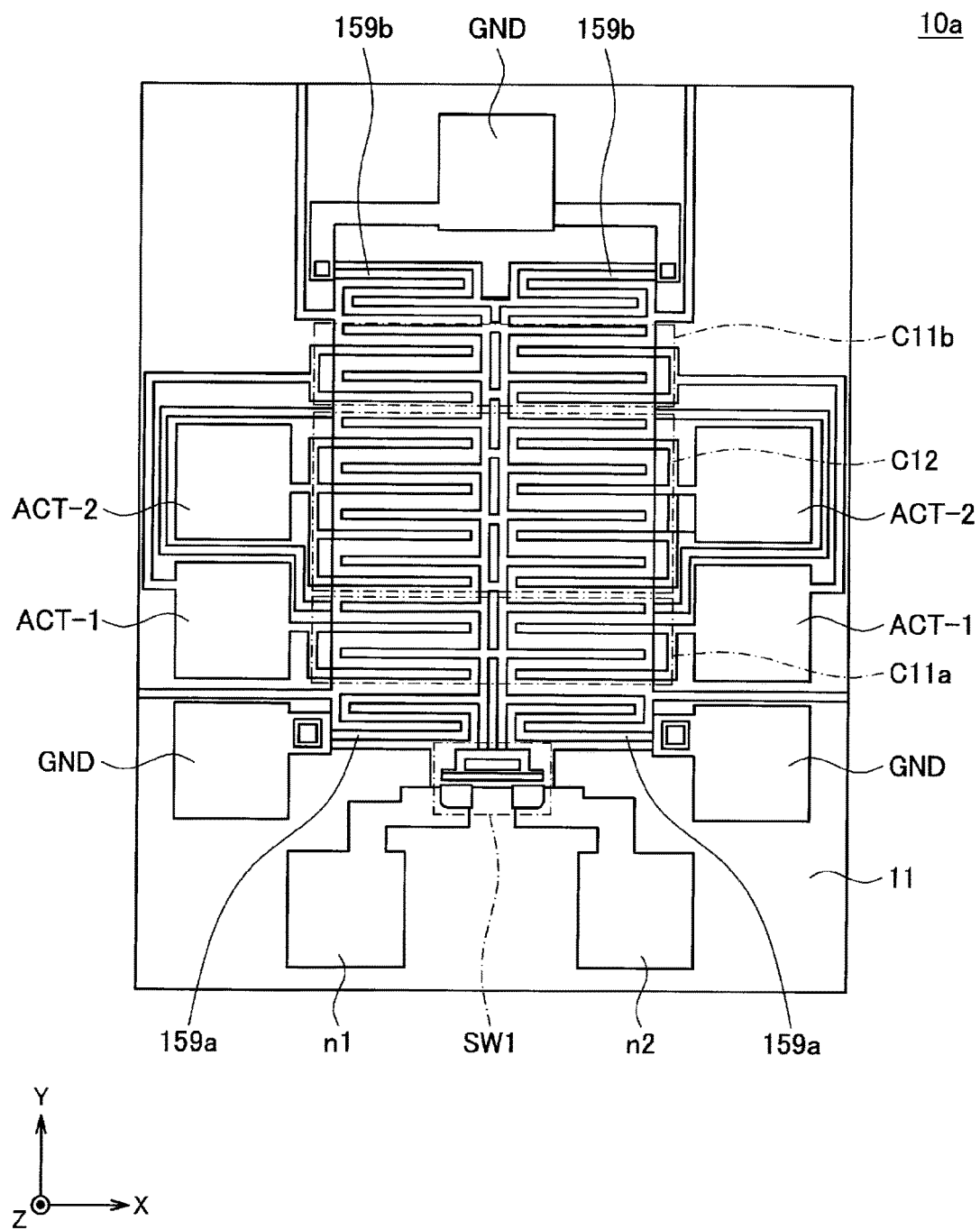
FIG. 10 is an explanatory diagram for describing an example of a configuration of a switch device according to a first modified example.

For example, FIG. 10 is an explanatory diagram for describing an example of the configuration of the switch device according to a first modified example, that is, a schematic plane view when the switch device according to the first modified example is viewed in the z direction (information). Hereinafter, the switch device according to the first modified example illustrated in FIG. 10 is also referred to as a "switch device 10a" to be distinguished from the switch device 10 described above with reference to FIGS. 6 to 9.

In the switch device 10 described above with reference to FIGS. 6 to 9, a plurality of fixed electrodes 17 connected to the terminal ACT-1 are provided on the −y direction side, and a plurality of fixed electrodes 17 connected to the terminal ACT-2 are provided on the +y direction side.

On the other hand, in the switch device 10a according to the first modified example illustrated in FIG. 10, a plurality of fixed electrodes 17 connected to the terminal ACT-2 are provided near the center in the y direction. A plurality of fixed electrodes 17 connected to the terminal ACT-1 are distributed and provided on both the +y direction side and the −y direction side with respect to a plurality of fixed electrodes 17 connected to the terminal ACT-2.

In the example illustrated in FIG. 10, the terminal ACT-1 and the terminal ACT-2 are electrically separated from each other, and the fixed electrode 17 connected to the terminal ACT-1 and the fixed electrode 17 connected to the terminal ACT-2 are also electrically separated from each other.

As described above as the first modified example, a position relation of the fixed electrodes 17 connected to the terminals ACT-1 and ACT-2 is not particularly limited as long as it is possible to electrically separate the fixed electrode 17 connected to the terminal ACT-1 from the fixed electrode 17 connected to the terminal ACT-2.

(Second Modified Example)

Figure 11:
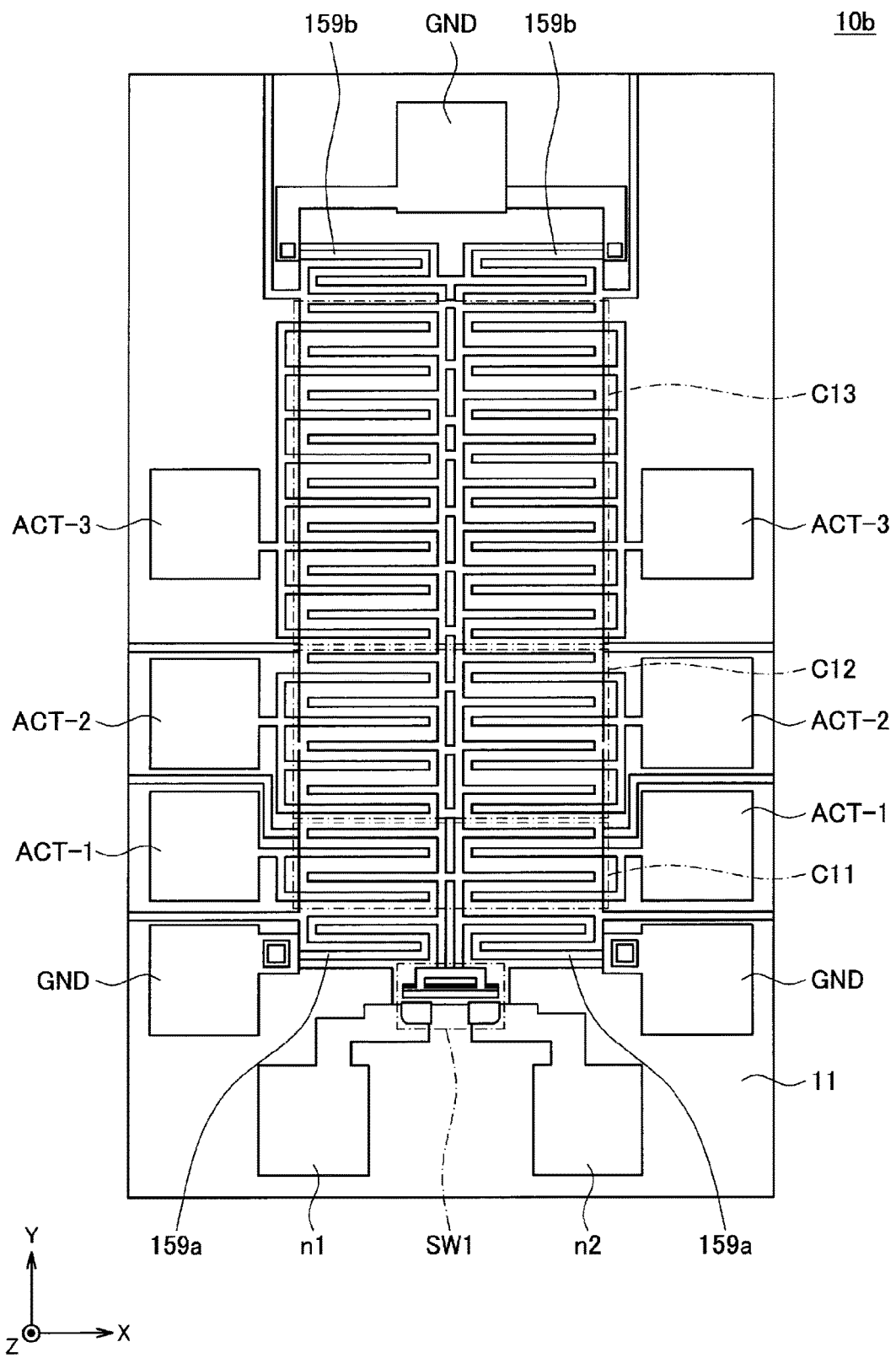
FIG. 11 is an explanatory diagram for describing an example of a configuration of a switch device according to a second modified example.

Further, FIG. 11 is an explanatory diagram for describing an example of the configuration of the switch device according to a second modified example, that is, a schematic plane view when the switch device according to the second modified example is viewed in the z direction (information). Hereinafter, the switch device according to the second modified example illustrated in FIG. 11 is also referred to as a "switch device 10b" to be distinguished from the switch device 10 described above with reference to FIGS. 6 to 9.

As illustrated in FIG. 11, a switch device 10b according to a second modified example includes terminals ACT-1 to ACT-3 as terminals to which the drive voltage is applied, and the fixed electrode 17 is connected to each of the terminals ACT-1 to ACT-3. The fixed electrodes 17 connected to the terminals ACT-1 to ACT-3 are provided to face different electrode members 153 among a plurality of electrode members 153 of the movable electrode section 15 along the y direction.

Through this configuration, the electrostatic actuators C11 to C13 are formed by the fixed electrodes 17 connected to the terminals ACT-1 to ACT-3 and the electrode members 153 of the movable electrode section 15. A mechanism of driving the electrostatic actuators C11 to C13 illustrated in FIG. 11 is similar to that in the case of the switch device 10 described above with reference to FIGS. 6 to 9. In the switch device 10b illustrated in FIG. 11, the drive voltage is applied to the terminal ACT-1 to drive the electrostatic actuator C11. Similarly, when the drive voltage is applied to the terminal ACT-2, the electrostatic actuator C12 is driven, and when the drive voltage is applied to the terminal ACT-3, the electrostatic actuator C13 is driven.

In the switch device 10b according to the second modified example, different numbers of fixed electrodes 17 are connected to the terminals ACT-1 to ACT-3, respectively. For example, in the example illustrated in FIG. 11, when the numbers of fixed electrodes 17 connected to the terminals ACT-1 to ACT-3 are $m_1$, $m_2$, and $m_3$ in order, the fixed electrodes 17 are provided so that $m_1 < m_2 < m_3$ is satisfied. Particularly, in the example illustrated in FIG. 11, the fixed electrodes 17 are provided so that the numbers $m_1$, $m_2$, and $m_3$ of the fixed electrodes 17 connected to the terminals ACT-1 to ACT-3 are increased with a power of 2 in this order (that is, so that $m_3 = 2^1 \times m_2 = 2^2 \times m_1$).

In other words, in the switch device 10b according to the second modified example, the areas of the portions in which the fixed electrodes 17 connected to the terminals ACT-1 to ACT-3 and the electrode member 153 face each other are different. Therefore, in the switch device 10b according to the second modified example, even when the drive voltage of the same voltage value is applied to the terminals ACT-1 to ACT-3, the strengths of the Coulomb forces generated between the fixed electrodes 17 and the electrode member 153 are different. In other words, in the switch device 10b according to the second modified example, the voltage value of the drive voltage (that is, the pull-in voltage) for controlling the switch section SW1 to enter the conduction state differs in accordance with a combination of terminals to which the drive voltage is applied among the terminals ACT-1 to ACT-3.

Through the above configuration, in the switch device 10b according to the second modified example, it is possible to set the pull-in voltage by the number of combinations of terminals to which the drive voltage is applied by selectively applying the drive voltage to the terminals ACT-1 to ACT-3.

As can be seen from a comparison with FIGS. 7, 9, and 10, the number of electrostatic actuators formed in the switch device is not particularly limited, and as the number of electrostatic actuators increases, the number of pull-in voltages that can be set increases.

Third Modified Example

Figure 12:
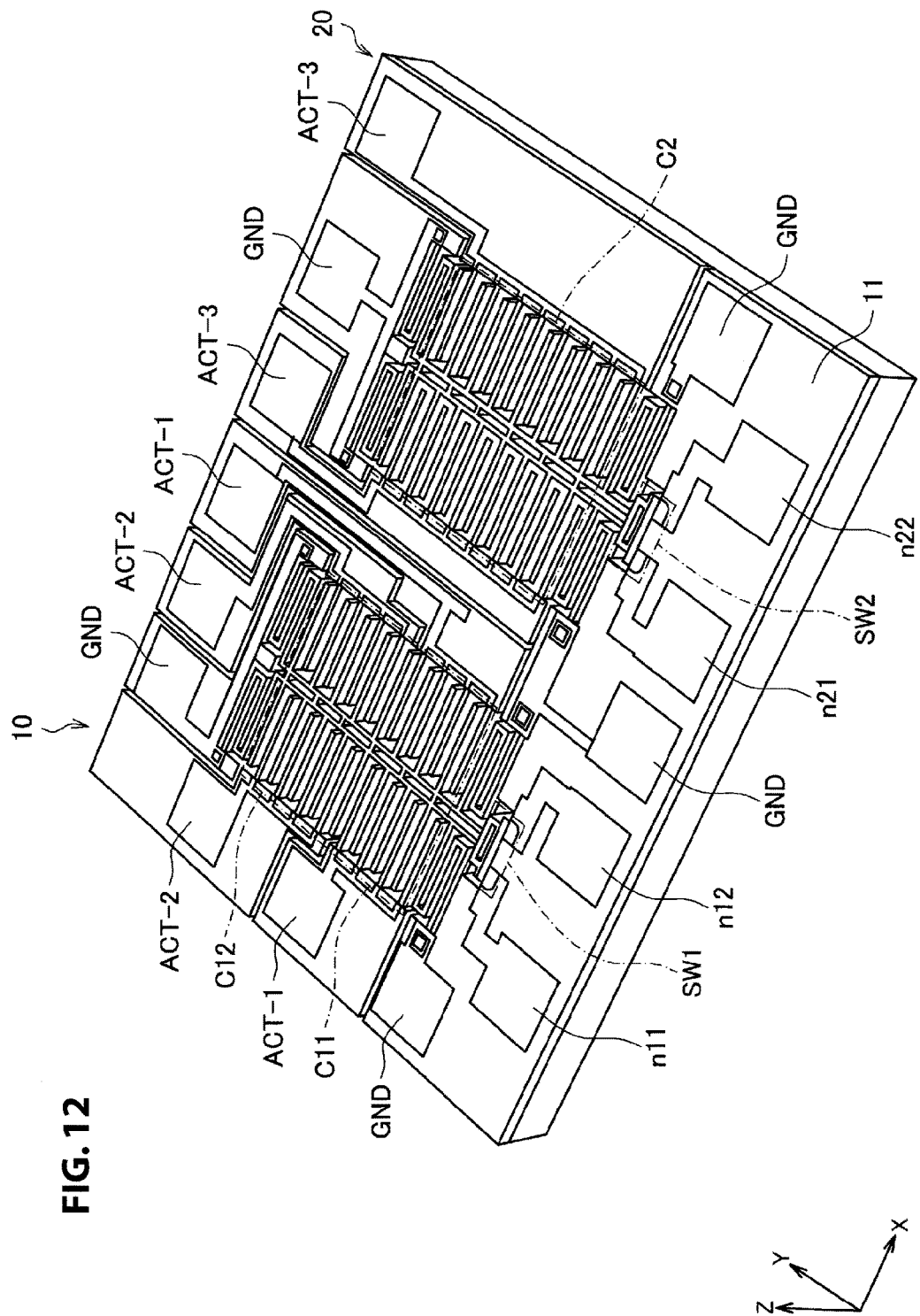
FIG. 12 is an explanatory diagram for describing an example of a configuration of a switch device according to a third modified example.

Next, an example in which a plurality of switch devices are provided on a common base section 11 (that is, on the same substrate) will be described as a third modified example with reference to FIG. 12. FIG. 12 is an explanatory diagram for describing an example of a configuration of a switch device according to the third modified example, that is, is a schematic perspective view of the switch device according to the third modified example.

In the example illustrated in FIG. 12, the switch device 10 described above with reference to FIGS. 6 to 9 and a switch device 20 which is different in a connection relation between electrodes to which the drive voltage is applied and the fixed electrodes 17 from the switch device 10 are provided on the common base section 11.

The switch device 10 controls the conduction state and the non-conduction state between the terminal n11 and the terminal n12. Further, the switch device 20 controls the conduction state and the non-conduction state between the terminal n21 and the terminal n22. A basic configuration and an operation principle of the switch devices 10 and 20 illustrated in FIG. 12 are similar to that of the switch device 10 described above with reference to FIGS. 6 to 9.

As illustrated in FIG. 12, the switch device 10 includes terminals ACT-1 and ACT-2 as terminals to which the drive voltage is applied. Thus, in the switch device 10, the electrostatic actuators C11 and C12 are formed by the fixed electrodes 17 connected to the terminals ACT-1 and ACT-2 and the electrode members 153 of the movable electrode section 15. In the switch device 10, at least one of the electrostatic actuator C11 and the electrostatic actuator C12 is driven to establish a connection between the terminal n11 and the terminal n12 via the switch section SW1, so that the terminal n11 and the terminal n12 are electrically connected (that is, they are controlled to enter the conduction state).

Further, the switch device 20 includes a terminal ACT-3 as a terminal to which the drive voltage is applied. Thus, in the switch device 20, the electrostatic actuator C2 is formed by the fixed electrode 17 connected to the terminal ACT-3 and the electrode members 153 of the movable electrode section 15. In the switch device 20, the electrostatic actuator C2 is driven to establish a connection between the terminal n21 and the terminal n22 via the switch section SW2, so that the terminal n21 and the terminal n22 are electrically connected (that is, they are controlled to enter the conduction state).

In the example illustrated in FIG. 12, the switch device 10 and the switch device 20 are formed on the base section 11 to be arranged along the x direction. Through this configuration, the switch device 10 and the switch device 20 can share some terminals (for example, the terminal GND connected to the reference potential), and thus the space can be saved to be smaller than when the switch devices 10 and 20 are individually provided.

Figure 13:
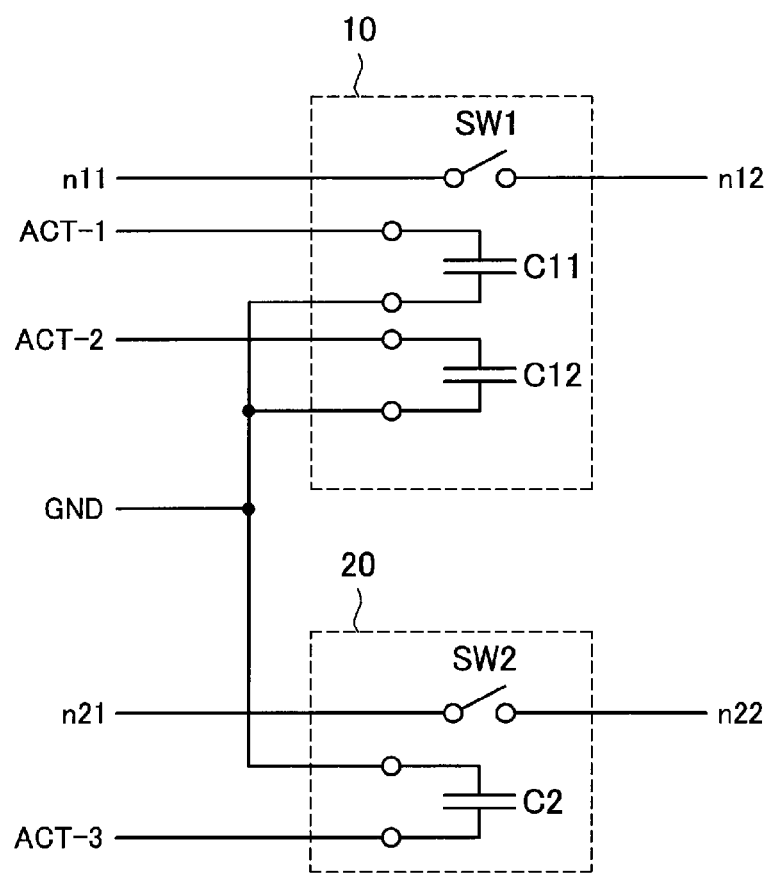
FIG. 13 is an explanatory diagram for describing a schematic circuit configuration of a switch device according to the third modified example.

Here, circuit diagrams of the switch devices 10 and 20 illustrated in FIG. 12 are schematically illustrated in FIG. 13. FIG. 13 is an explanatory diagram for describing a schematic circuit configuration of the switch device according to the third modified example and schematically illustrates an example of circuit configurations of the switch devices 10 and 20 illustrated in FIG. 12.

The configurations of the switch devices 10 and 20 illustrated in FIG. 12 are merely examples and are not necessarily limited to the same configurations. In other words, an arrangement relation of a plurality of switch devices on the base section 11 is not particularly limited as long as some terminals can be shared by a plurality of switch devices (for example, by the switch devices 10 and 20).

As described above, the examples of the configuration of the switch device 10 according to one embodiment of the present disclosure have been described as the modified examples with reference to FIGS. 10 to 13.

3. INFORMATION TRANSMITTING TERMINAL

As an example of an information transmitting terminal to which the switch device 10 is applied, examples of a configuration of an information transmitting terminal that can be appropriately switched between a plurality of different purposes and used will be described below as examples.

3.1. First Example

<<3.1.1. Configuration of Information Transmitting Terminal>>

Figure 14:
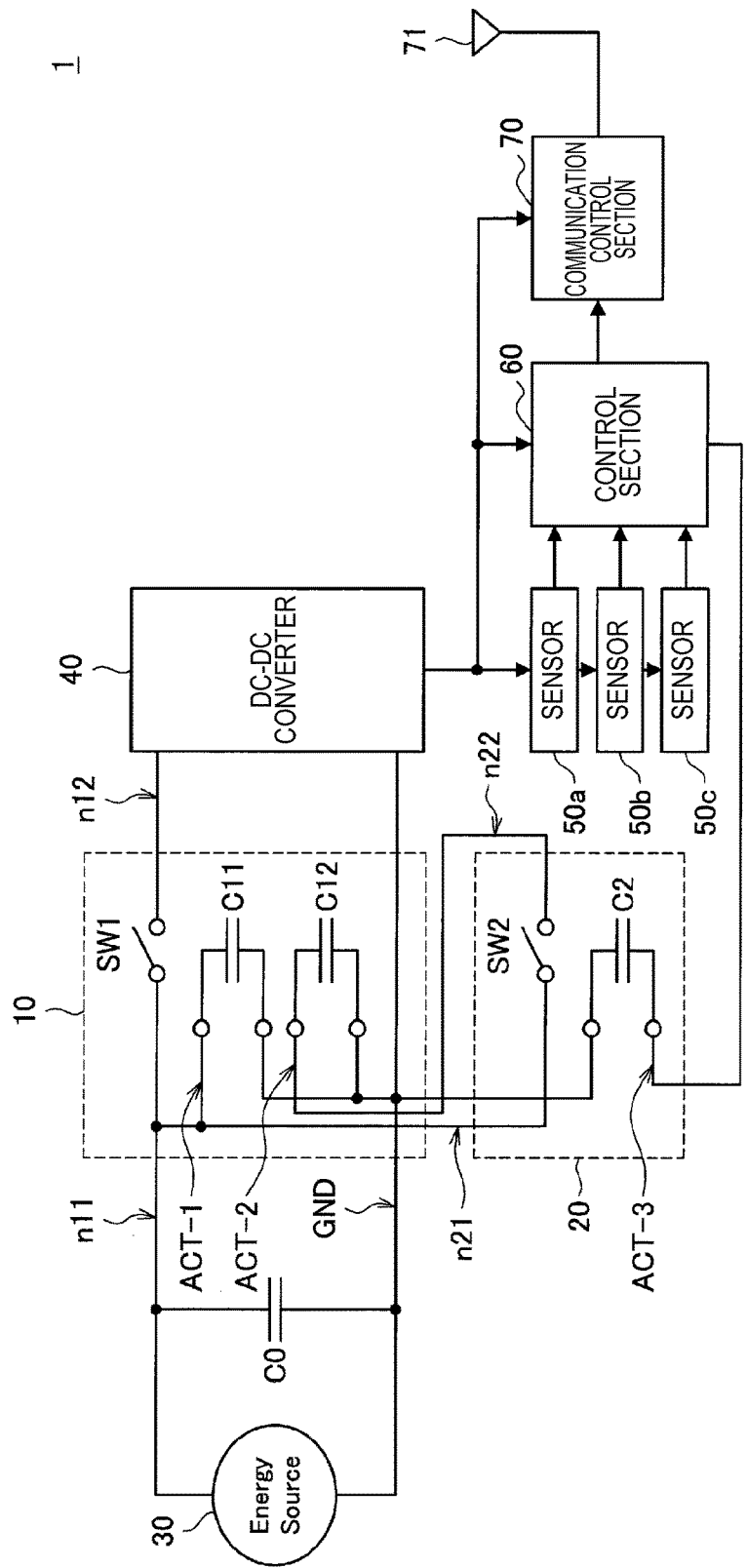
FIG. 14 is an explanatory diagram for describing an example of a configuration of an information transmitting terminal according to a first example.

First, an example of a configuration of an information transmitting terminal that is equipped with a plurality of sensors and that configured to be able to appropriately switch a sensor to be used in accordance with a purpose will be described as a first example with reference to FIG. 14. FIG. 14 is an explanatory diagram for describing an example of a configuration of an information transmitting terminal according to the first example.

As illustrated in FIG. 14, the information transmitting terminal 1 according to the first example includes a power supply source 30, a storage capacitor C0, switch devices 10 and 20, a DC-DC converter 40, sensors 50a to 50c, a control section 60, a communication control section 70, and a communication section 71. The configurations of the power supply source 30, the DC-DC converter 40, the communication control section 70, and the communication section 71 are similar to those of the information transmitting terminal 1' according to the comparative example described above with reference to FIG. 2, and thus detailed description thereof is omitted.

As illustrated in FIG. 14, in the information transmitting terminal 1 according to the first example, the storage capacitor C0 and the DC-DC converter 40 are connected via the switch device 10. In the information transmitting terminal 1 according to the first example, for example, the switch device 10 described above with reference to FIGS. 6 to 9 can be applied as the switch device 10. In other words, the switch device 10 includes electrostatic actuators C11 and C12, and drives at least one of the electrostatic actuators C11 and C12 to perform control such that the switch section SW1 enters the conduction state.

Further, the switch device 20 includes a switch section SW2 and an electrostatic actuator C2, and drives the electrostatic actuator C2 to controls the conduction state and the non-conduction state of the switch section SW2.

Here, the connection relation of the switch devices 10 and 20 will be described in further detail. In the following description, a wiring on the storage capacitor C0 side with respect to the switch section SW1 is also referred to as a "terminal n11", and a wiring on the DC-DC converter 40 side is also referred to as a "terminal n12." Further, a wiring on the side opposite to the terminal n11 with respect to the storage capacitor C0 corresponds to the reference potential and is hereinafter also referred to as a "terminal GND."

In the electrostatic actuator C11 of the switch device 10, one terminal is connected to the terminal n11 side and the other terminal is connected to the terminal GND side. Among the terminals of the electrostatic actuator C11, the terminal connected to the terminal n11 side corresponds to the terminal ACT-1 in the switch device 10 illustrated in FIG. 6.

In the electrostatic actuator C12 of the switch device 10, one terminal is connected to the terminal n11 side via the switch section SW2 of the switch device 20, and the other terminal is connected to the terminal GND side. Among the terminals of the electrostatic actuator C12, the terminal connected to the terminal n11 side via the switch section SW2 of the switch device 20 corresponds to the terminal ACT-2 in the switch device 10 illustrated in FIG. 6.

Through this configuration, when the switch section SW2 is in the conduction state, the drive voltage based on the electric power stored in the storage capacitor C0 is applied to both the terminals ACT-1 and ACT-2. In this case, both of the electrostatic actuators C11 and C12 are driven on the basis of the drive voltage. In other words, when the switch section SW2 is in the conduction state, the pull-in voltage of the switch device 10 corresponds to the pull-in voltage for driving both electrostatic actuators C11 and C12. The pull-in voltage of the switch device 10 when the switch section SW2 is in the conduction state is also hereinafter referred to as a "first pull-in voltage V1."

Further, when the switch section SW2 of the switch device 20 is in the non-conduction state, the drive voltage according to the electric power stored in the storage capacitor C0 is applied to only the terminal ACT-1 among the terminals ACT-1 and ACT-2. In this case, only the electrostatic actuator C11 among the electrostatic actuators C11 and C12 is driven on the basis of the drive voltage. In other words, when the switch section SW2 is in the non-conduction state, the pull-in voltage of the switch device 10 corresponds to the pull-in voltage when only the electrostatic actuator C11 is driven. The pull-in voltage of the switch device 10 when the switch section SW2 is in the non-conduction state is also hereinafter referred to as a "second pull-in voltage V2."

Here, as described above with reference to FIGS. 6 to 9, by driving both the electrostatic actuators C11 and C12, the switch device 10 can perform control such that the switch section SW1 enters the conduction state by the drive voltage having the smaller voltage value than when only the electrostatic actuator C11 is driven. In other words, in the information transmitting terminal 1 illustrated in FIG. 14, by performing switching between the conduction state and the non-conduction state of the switch section SW2 of the switch device 20, it is possible to selectively switch the pull-in voltage of the switch device 10 between the first pull-in voltage V1 and the second pull-in voltage V2.

The DC-DC converter 40 is connected to the storage capacitor C0 via the switch device 10. In other words, when the switch section SW1 of the switch device 10 is switched to the conduction state, the electric power stored in the storage capacitor C0 is supplied to the DC-DC converter 40 via the switch section SW1.

The DC-DC converter 40 is supplied with the electric power stored in the storage capacitor C0, transforms the voltage value of the electric power, and supplies the transformed electric power to the sensors 50*a* to 50*c*, the control section 60, and the communication control section 70. Accordingly, the sensors 50*a* to 50*c*, the control section 60, and the communication control section 70 can be driven on the basis of the electric power supplied from the DC-DC converter 40.

Next, the description will proceed focusing on the control of the switch device 20. In the electrostatic actuator C2 of the switch device 20, one terminal is connected to control section 60, and the other terminal is connected to the terminal GND. In other words, the electrostatic actuator C2 is driven in accordance with the drive voltage applied from the control section 60, and the switch section SW2 is controlled to enter the conduction state by driving the electrostatic actuator C2.

As the electrostatic actuator C2 of the switch device 20, a mechanism similar to the electrostatic actuators C11 and C12 of the switch device 10 described above with reference to FIGS. 6 to 9 may be used. In this case, as the switch devices 10 and 20, for example, the switch devices 10 and 20 described above with reference to FIGS. 12 and 13 may be applied. The terminal connected to the control section 60 side among the terminals of the electrostatic actuator C2 corresponds to the terminal ACT-3 in the switch device 20 illustrated in FIGS. 12 and 13.

Next, an example of an operation of the control section 60 in the information transmitting terminal 1 according to the first example will be described. In the information transmitting terminal 1 according to the first example, the control section 60 operates while appropriately performing switching between a first mode in which only the sensor 50*a* is driven and a second mode in which all of the sensors 50*a* to 50*c* are driven.

In other words, the control section 60 is driven on the basis of the electric power supplied from the DC-DC converter 40, and acquires data detected from the sensor 50*a* or the sensors 50*a* to 50*c* in accordance with the operation mode. Specifically, when operating in the first mode, the control section 60 acquires data only from the sensor 50*a*. Further, when operating in the second mode, the control section 60 acquires data from both of the sensors 50*a* to 50*c*. Then, the control section 60 controls the operation of the communication control section 70 such that the communication control section 70 transmits the acquired data to the external device.

In the second mode, the control section 60 drives all of the sensors 50*a* to 50*c*, and acquires data indicating a detection result from each of the sensors 50*a* to 50*c*. In other words, during the operation in the second mode in which all of the sensors 50*a* to 50*c* are driven, more electric power is consumed than in the case of the operation in the first mode in which only the sensor 50*a* is driven.

Therefore, during the next operation, the control section 60 controls the pull-in voltage of the switch device 10 in accordance with a next operation mode in order to be supplied with the electric power according to the operation mode at the time of next operation (that is, so that the electric power according to the operation mode is stored in the storage capacitor C0).

Specifically, when driving is performed on the basis of the electric power supplied from the DC-DC converter 40, the control section 60 sets the next operation mode to either of the first mode and the second mode on the basis of predetermined conditions.

When the next operation mode is the first mode, the control section 60 drives the electrostatic actuator C2 by applying the drive voltage to the terminal ACT-3 and controls the switch section SW2 of the switch device 20 to enter the conduction state. Accordingly, the drive voltage based on the electric power stored in the storage capacitor C0 is applied to both the terminals ACT-1 and ACT-2 of the switch device 10, and the pull-in voltage of the switch device 10 is switched to the first pull-in voltage V1.

Further, when the next operation mode is the second mode, the control section 60 controls the switch section SW2 of the switch device 20 to enter the non-conduction state by suppressing the applying of the drive voltage to the terminal ACT-3. At this time, the control section 60 may control the switch section SW2 of the switch device 20 to enter the non-conduction state by connecting the terminal ACT-3 to the reference potential (for example, GND). Accordingly, the drive voltage based on the electric power stored in the storage capacitor C0 is applied only to the terminal ACT-1 out of the terminals ACT-1 and ACT-2 of the switch device 10, and the pull-in voltage of the switch device 10 is switched to the second pull-in voltage V2.

In a period in which the control section 60 is stopped (that is, a period in which the supply of the electric power to the control section 60 is stopped), the applying of the drive voltage from the control section 60 to the terminal ACT-3 of the switch device 20 is also stopped. Therefore, it is desirable to perform control such that a control signal for applying the drive voltage from control section 60 to the terminal ACT-3 has high impedance. Through this control, when the switch section SW2 of the switch device 20 is controlled to enter the conduction state, even after the control section 60 is stopped and the applying of the drive voltage to the terminal ACT-3 is stopped, the conduction state of the switch section SW2 can be held. The switch device 20 having such a configuration corresponds to an example of a "self-storage type switch."

In the above description, the example of the configuration in which the switching between the conduction state and the non-conduction state of the switch section SW2 is performed by driving the electrostatic actuator C2 has been described as the switch device 20. On the other hand, the configuration of the switch device 20 is not necessarily limited to the above configuration as long as the switching between the conduction state and the non-conduction state of the switch section SW2 can be selectively performed.

In the example illustrated in FIG. 14, the control section 60 switches the switch device 20 in accordance with circumstances, but an entity that controls the switch device 20 is not necessarily limited to the control section 60. As a specific example, the user may cause the control section 60 to switch the switch device 20 by operating the control section 60 through an operation section (not illustrated). As another example, the user may manually switch the switch device 20 in accordance with a desired purpose.

The example of the configuration of the information transmitting terminal 1 according to the first example has been described above with reference to FIG. 14.

<<3.1.2. Operation of Information Transmitting Terminal>>

Figure 15:
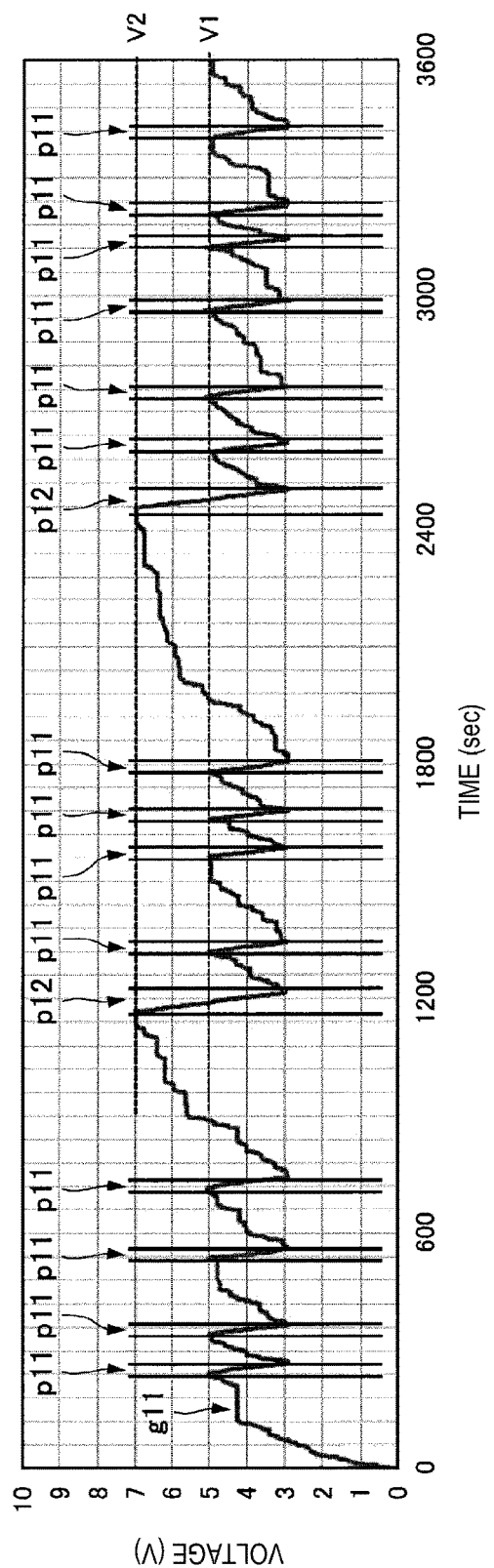
FIG. 15 is an explanatory diagram for describing an example of an operation of the information transmitting terminal according to the first example.

Next, an example of a chronological operation of the information transmitting terminal 1 according to the first example will be described with reference to FIG. 15. FIG. 15 is an explanatory diagram for describing an example of the operation of the information transmitting terminal 1 according to the first example, and illustrates an example of a chronological change in a voltage value according to the electric power stored in the storage capacitor C0 with the operation of the information transmitting terminal 1. In other words, a graph g11 illustrated in FIG. 15 illustrates an example of a chronological change in a potential of the terminal n11 in FIG. 14 (that is, the voltage value according to the electric power stored in the storage capacitor C0). In FIG. 15, a vertical axis indicates a potential (V) of the terminal n11, and a horizontal axis indicates a time (sec).

In the example illustrated in FIG. 15, the control section 60 of the information transmitting terminal 1 switches the operation mode to the second mode each time a predetermined number of operations are performed in the first mode.

For example, in the example illustrated in FIG. 15, the control section 60 first operates in the first mode in which only the sensor 50a is driven. Specifically, in the first mode, the control section 60 applies the drive voltage to the terminal ACT-3, drives the electrostatic actuator C2, and controls the switch section SW2 of the switch device 20 to enter the conduction state. Accordingly, the drive voltage according to the electric power stored in the storage capacitor C0 is applied to the terminals ACT-1 and ACT-2 of the switch device 10. In this case, the pull-in voltage of the switch device 10 is switched to the first pull-in voltage V1.

Then, when the voltage value of the drive voltage applied to terminals ACT-1 and ACT-2 reaches the first pull-in voltage V1 as the electric power stored in the storage capacitor C0 with the passage of time, the switch section SW1 of the switch device 10 is switched to the conduction state. A mechanism in which the switch section SW1 of the switch device 10 is switched to the conduction state in accordance with the voltage value of the applied drive voltage is similar to that described above with reference to FIGS. 6 to 9.

When the switch section SW1 of the switch device 10 is switched to the conduction state, the electric power is supplied from the storage capacitor C0 to the DC-DC converter 40 via the switch section SW1. For example, in FIG. 15, a period denoted by reference numeral p11 indicates a period in which the electric power stored in the storage capacitor C0 is supplied to the DC-DC converter 40 when the pull-in voltage of the switch device 10 is controlled to be switched to the first pull-in voltage V1.

The DC-DC converter 40 transforms the voltage value of the electric power supplied from the storage capacitor C0 and supplies the transformed electric power to the sensors 50a to 50c, the control section 60, and the communication control section 70. Accordingly, the sensors 50a to 50c, the control section 60, and the communication control section 70 can be driven.

As the electric power is supplied from the storage capacitor C0 to the DC-DC converter 40, the electric power stored in the storage capacitor C0 decreases with the passage of time. Accordingly, the voltage value of the drive voltage applied from the storage capacitor C0 to the terminals ACT-1 and the ACT-2 of the switch device 10 decreases with the passage of time. Then, when the voltage value of the drive voltage falls below the pull-out voltage (that is, a predetermined threshold value) of the switch device 10, the switch section SW1 of the switch device 10 is switched to the non-conduction state.

When the switch device 90 enters the non-conduction state, the supply of the electric power from the storage capacitor C0 to the DC-DC converter 40 is stopped. Accordingly, the storage of the electric power supplied from the power supply source 30 to the storage capacitor C0 is resumed.

In the example illustrated in FIG. 15, the control section 60 repeats the above operation, and when the number of operations in the first mode reaches a threshold value, the control section 60 sets the next operation mode to the second mode in which all of the sensors 50a to 50c are driven at the time of driving.

Specifically, when the next operation mode is the second mode, the control section 60 controls the switch section SW2 of the switch device 20 to the non-conduction state by suppressing the applying of the drive voltage to the terminal ACT-3. Accordingly, the drive voltage according to the electric power stored in the storage capacitor C0 is applied only to the terminal ACT-1 out of the terminals ACT-1 and ACT-2 of the switch device 10. In this case, the pull-in voltage of the switch device 10 is switched to the second pull-in voltage V2 higher than the first pull-in voltage V1.

Then, when the voltage value of the drive voltage applied to the terminal ACT-1 reaches the second pull-in voltage V2 as the electric power is stored in the storage capacitor C0 with the passage of time, the switch section SW1 of the switch device 10 is switched to the conduction state.

When the switch section SW1 of the switch device 10 is controlled to enter the conduction state, the electric power is supplied from the storage capacitor C0 to the DC-DC converter 40 via the switch section SW1. For example, in FIG. 15, a period denoted by reference numeral p12 indicates a period in which the electric power stored in the storage capacitor C0 is supplied to the DC-DC converter 40 when the pull-in voltage of the switch device 10 is controlled to be switched to the second pull-in voltage V2.

A subsequent operation is similar to that at the time of the operation in the first mode. In the example illustrated in FIG. 15, the control section 60 sets the next operation mode to the first mode after the operation in the second mode. In other words, the pull-in voltage of the switch device 10 is set to the first pull-in voltage V1 again.

The example of the chronological operation of the information transmitting terminal 1 according to the first example, particularly, the chronological change in the voltage value according to the electric power stored in the storage capacitor C0 with the operation of the information transmitting terminal 1 has been described above with reference to FIG. 15.

<<3.1.3. Control Timing of Switch Device>>

Next, an example of control timings of switch devices 10 and 20 will be described in further detail.

As described above, the switch device 10 can selectively switch the pull-in voltage between the first pull-in voltage V1 and the second pull-in voltage V2. On the other hand, there are cases in which the switch device using the electrostatic actuator such as the switch device 10 has a hysteresis characteristic, and the pull-out voltage changes in proportion to the pull-in voltage. Therefore, for example, when the switch device 10 is driven by the second pull-in voltage higher than the first pull-in voltage, the pull-out voltage may be higher than when driving is performed by the first pull-in voltage.

In this regard, in this specification, an example of control for setting the pull-out voltage to a predetermined voltage value regardless of the pull-in voltage even when the pull-in voltage of the switch device 10 is selectively switched between the first pull-in voltage V1 and the second pull-in voltage V2 will be described.

Figure 16:
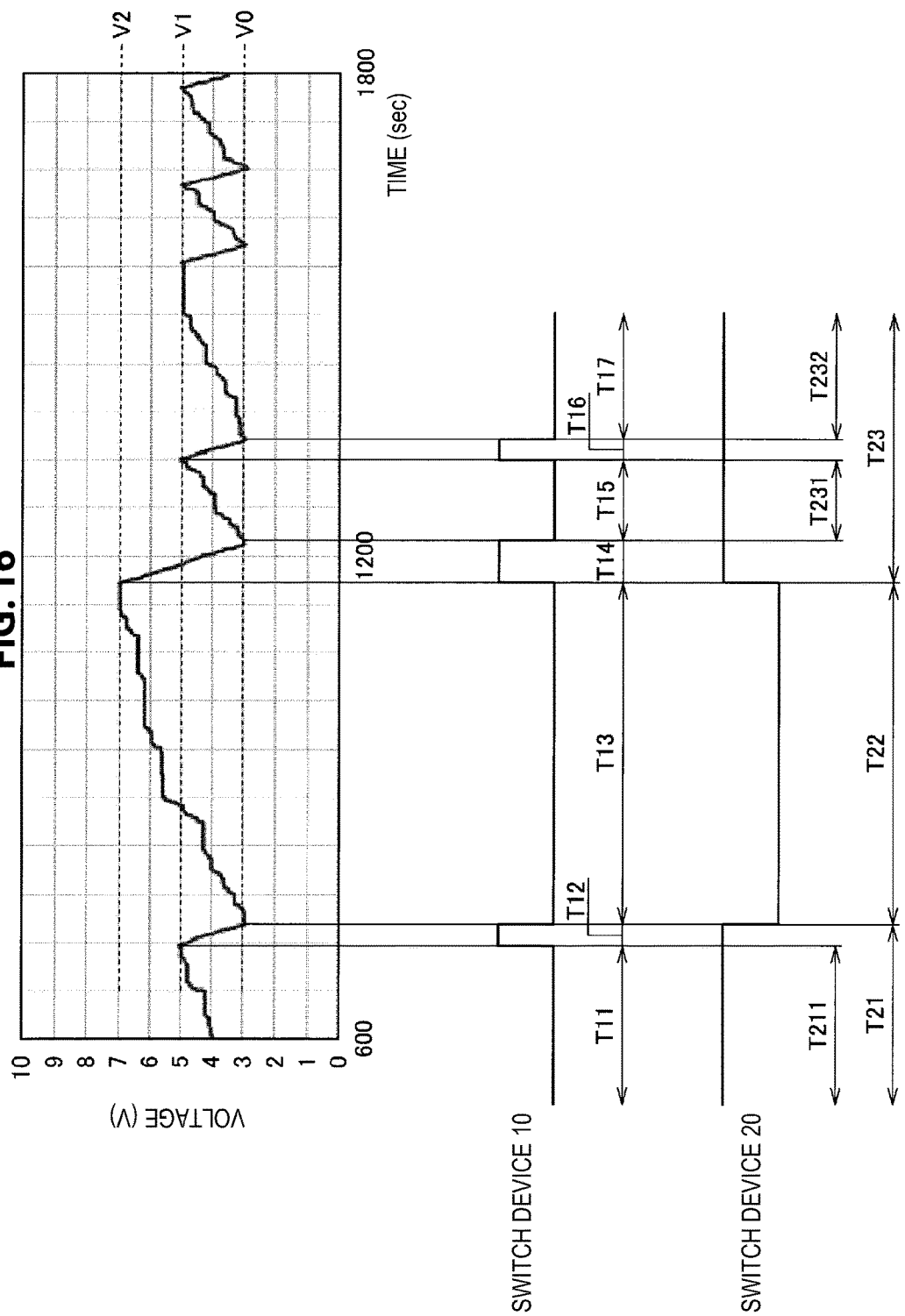
FIG. 16 is an explanatory view for describing an example of a control timing of a switch device in an information transmitting terminal according to the first example.

For example, FIG. 16 is an explanatory diagram for describing an example of control timings of the switch devices 10 and 20 in the information transmitting terminal 1 according to the first example. A graph illustrated on the upper side of FIG. 16 illustrates an example of a chronological change in a voltage value according to the electric power stored in the storage capacitor C0 with the operation of the information transmitting terminal 1, and a vertical axis indicates a potential (V) of the terminal n11 in FIG. 14, and a horizontal axis indicates a time (sec). Further, a diagram on the lower side of FIG. 16 is a timing chart illustrating drive timings of the switch devices 10 and 20.

First, a timing chart of the switch device 10 is described. In FIG. 16, periods denoted by reference numerals T11, T13, T15, and T17 indicate periods in which the switch section SW1 of the switch device 10 is controlled to enter the non-conduction state, and in these periods, the electric power supplied from the power supply source 30 is stored in the storage capacitor C0. Further, periods indicated by reference numerals T12, T14, and T16 indicate periods in which the switch section SW1 of the switch device 10 is controlled to enter the conduction state, and in these periods, the electric power stored in the storage capacitor C0 is supplied to the DC-DC converter 40. In the example illustrated in FIG. 16, the switch device 10 is switched to the conduction state by the first pull-in voltage V1 in the periods T12 and T16 and switched to the conduction state by the second pull-in voltage V2 in the period T14.

Here, a timing chart of switch device 20 is described. In FIG. 16, period indicated by reference numerals T21 and T23 indicate periods in which the switch section SW2 of the switch device 20 is controlled to enter the conduction state. Further, a period indicated by reference numeral T22 indicates a period in which the switch section SW2 of the switch device 20 is controlled to enter the non-conduction state.

The control section 60 is driven only in the periods T12, T14, and T16 in which the electric power is supplied from the DC-DC converter 40. Therefore, in the periods indicated by reference numerals T211, T231, and T233 (that is, a period in which the control section 60 does not operate) in the periods T21 and T23 in which the switch section SW2 is controlled to enter the conduction state, the conduction state of switch section SW2 is held due to self-capacitance of the electrostatic actuator C2 of the switch device 20.

Further, the control section 60 controls the switch section SW2 of the switch device 20 to enter the conduction state in the period (that is, the periods T12, T14, and T16) in which the switch section SW1 of the switch device 10 is controlled to enter the conduction state. Even when the switch section SW2 of the switch device 20 is switched to the non-conduction state, the control section 60 switches the switch section SW2 of the switch device 20 to the non-conduction state in accordance with a timing at which the switch section SW1 of the switch device 10 is switched to the non-conduction state.

Through such control, even when the pull-in voltage of the switch device 10 is switched between the first pull-in voltage V1 and the second pull-in voltage V2, the pull-out voltage of the switch device 10 can be controlled to be a voltage value indicated by reference numeral V0. In the example illustrated in FIG. 16, the switch devices 10 and 20 are configured so that the pull-out voltage V0 of the switch device 10 is 3 (V).

With reference to FIG. 16, an example of control for setting the pull-out voltage to a predetermined voltage value regardless of the pull-in voltage even when the pull-in voltage of the switch device 10 is selectively switched between the first pull-in voltage V1 and the second pull-in voltage V2 has been described.

3.2. Second Example

<<3.2.1. Configuration of Information Transmitting Terminal>>

Figure 17:
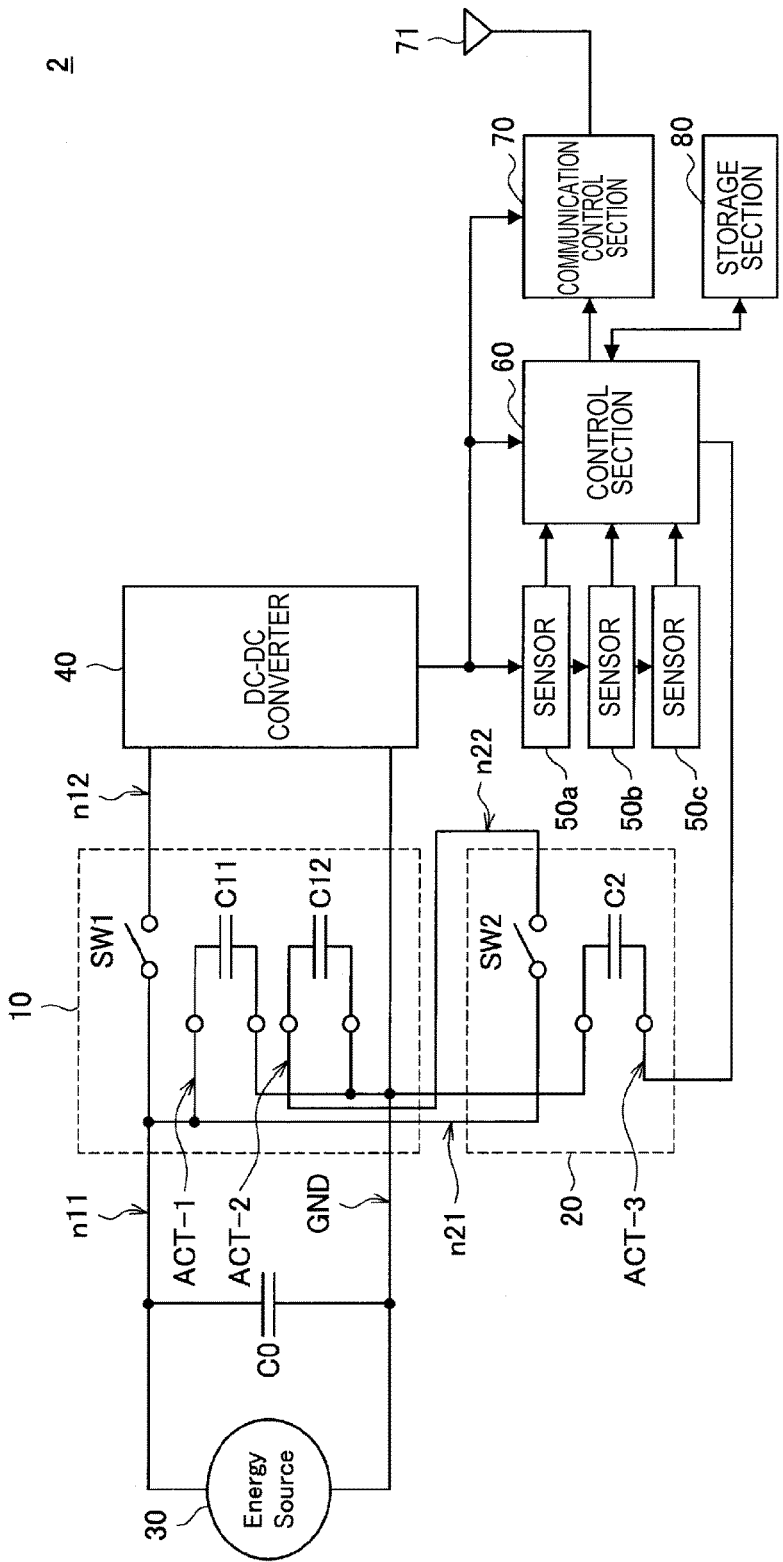
FIG. 17 is an explanatory diagram for describing an example of a configuration of an information transmitting terminal according to a second example.

Next, as a second example, an example of a configuration of an information transfer terminal capable of appropriately switching between acquisition of various kinds of data by a sensor and transmission of the acquired data to the external device will be described with reference to FIG. 17. FIG. 17 is an explanatory diagram for describing an example of a configuration of the information transmitting terminal according to the second example. In the following description, the information transmitting terminal according to the second example is also referred to as an "information transmitting terminal 2" in order to be distinguished from the information transmitting terminal 1 according to the first example.

As illustrated in FIG. 17, the information transmitting terminal 2 according to the second example differs from the information transmitting terminal 1 according to the first example in that a storage section 80 is included. Therefore, hereinafter, a functional configuration of the information transmitting terminal 2 according to the second example will be described focusing on differences with the information transmitting terminal 1 according to the first example, and detailed description of the remaining portions is omitted.

The information transmitting terminal 2 according to the second example operates while appropriately performing switching between a first mode in which the sensors 50$a$ to 50$c$ are driven, and various kinds of data are acquired and stored in the storage section 80 and a second mode in which the data stored in the storage section 80 is transmitted to the external device. In this specification, when an operation is performed in the second mode in which the data stored in the storage section 80 is transmitted to the external device, more electric power is assumed to be consumed than when an operation is performed in the first mode in which the sensors 50$a$ to 50$c$ are driven, and various kinds of data are acquired.

In other words, when an operation is performed in the first mode, the control section 60 according to the second example acquires data indicating detection results from the sensors 50$a$ to 50$c$, and stores the acquired data in the storage section 80. Further, when an operation is performed in the second mode, the control section 60 reads the various kinds of data stored in the storage section 80 (that is, the data previously acquired from the sensors 50$a$ to 50$c$) and controls the operation of the communication control section 70 such that the communication control section 70 transmits the read data to the external device.

Further, similarly to the control section 60 according to the first example described above, the control section 60 according to the second example controls the pull-in voltage of the switch device 10 in accordance with the next operation mode in order to be supplied with the electric power according to the operation mode at the time of the next operation.

In other words, when the next operation mode is the first mode, the control section 60 drives the electrostatic actuator C2 by applying the drive voltage to the terminal ACT-3, and controls the switch section SW2 of the switch device 20 to enter the conduction state. Accordingly, the pull-in voltage of the switch device 10 is switched to the first pull-in voltage V1 for causing the electric power necessary for the control section 60 to operate in the first mode to be stored in the storage capacitor C0.

Further, when the next operation mode is the second mode, the control section 60 controls the switch section SW2 of the switch device 20 to enter the non-conduction state by suppressing the applying of the drive voltage to the terminal ACT-3. Accordingly, the pull-in voltage of the switch device 10 is switched to the second pull-in voltage V2 higher than the first pull-in voltage V1 for causing the electric power necessary for the control section 60 to operate in the second mode to be stored in the storage capacitor C0.

The example of the configuration of the information transmitting terminal 2 according to the second example has been described above with reference to FIG. 17.

<<3.1.2. Operation of Information Transmitting Terminal>>

Figure 18:
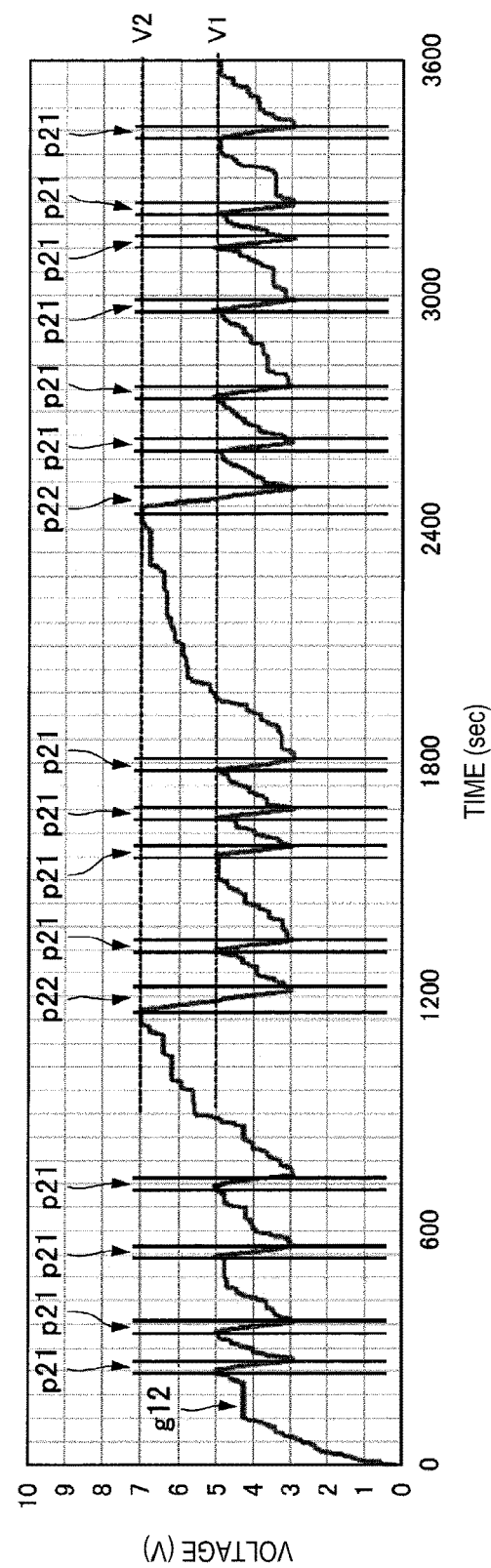
FIG. 18 is an explanatory diagram for describing an example of an operation of the information transmitting terminal according to the second example.

Next, an example of a chronological operation of the information transmitting terminal 2 according to the second example will be described with reference to FIG. 18. FIG. 18 is an explanatory diagram for describing an example of the operation of the information transmitting terminal 2 according to the second example, and illustrates an example of a chronological change in a voltage value according to the electric power stored in the storage capacitor C0 with the operation of the information transmitting terminal 2. In other words, a graph g12 illustrated in FIG. 18 illustrates an example of a chronological change in a potential of the terminal n11 in FIG. 17 (that is, the voltage value according to the electric power stored in the storage capacitor C0). In FIG. 18, a vertical axis indicates a potential (V) of the terminal n11, and a horizontal axis indicates a time (sec).

In an example illustrated in FIG. 18, similarly to the information transmitting terminal 1 according to the first example (see FIG. 15), the control section 60 of the information transmitting terminal 2 switches the operation mode to the second mode each time a predetermined number of operations are performed in the first mode.

In other words, in the example illustrated in FIG. 18, the control section 60 first operates in the first mode in which the sensors 50a to 50c are driven, various kinds of data are acquired, and the acquired data is stored in the storage section 80. Specifically, in the first mode, the control section 60 applies the drive voltage to the terminal ACT-3, drives the electrostatic actuator C2, and controls the switch section SW2 of the switch device 20 to enter the conduction state. Accordingly, the drive voltage according to the electric power stored in the storage capacitor C0 is applied to the terminals ACT-1 and ACT-2 of the switch device 10, and the pull-in voltage of the switch device 10 is switched to the first pull-in voltage V1.

Then, when the voltage value of the drive voltage applied to terminals ACT-1 and ACT-2 reaches the first pull-in voltage V1 as the electric power stored in the storage capacitor C0 with the passage of time, the switch section SW1 of the switch device 10 is switched to the conduction state.

When the switch section SW1 of the switch device 10 is switched to the conduction state, the electric power is supplied from the storage capacitor C0 to the DC-DC converter 40 via the switch section SW1. For example, in FIG. 18, a period denoted by reference numeral p21 indicates a period in which the electric power stored in the storage capacitor C0 is supplied to the DC-DC converter 40 when the pull-in voltage of the switch device 10 is controlled to be switched to the first pull-in voltage V1.

The DC-DC converter 40 transforms the voltage value of the electric power supplied from the storage capacitor C0 and supplies the transformed electric power to the sensors 50a to 50c, the control section 60, and the communication control section 70. Accordingly, the sensors 50a to 50c, the control section 60, and the communication control section 70 can be driven.

In other words, the control section 60 is driven on the basis of the electric power supplied from the DC-DC converter 40, acquires data indicating the detection results from the sensors 50a to 50c, and stores the acquired data in the storage section 80.

As the electric power is supplied from the storage capacitor C0 to the DC-DC converter 40, the electric power stored in the storage capacitor C0 decreases with the passage of time. Accordingly, the voltage value of the drive voltage applied from the storage capacitor C0 to the terminals ACT-1 and the ACT-2 of the switch device 10 decreases with the passage of time. Then, when the voltage value of the drive voltage falls below the pull-out voltage (that is, a predetermined threshold value) of the switch device 10, the switch section SW1 of the switch device 10 is switched to the non-conduction state.

When the switch device 90 enters the non-conduction state, the supply of the electric power from the storage capacitor C0 to the DC-DC converter 40 is stopped. Accordingly, the storage of the electric power supplied from the power supply source 30 to the storage capacitor C0 is resumed.

In the example illustrated in FIG. 18, the control section 60 repeats the above operation, and when the number of operations in the first mode reaches a threshold value, the control section 60 sets the next operation mode to the second mode in which the data stored in the storage section 80 is transmitted to the external device at the time of driving.

Specifically, when the next operation mode is the second mode, the control section 60 controls the switch section SW2 of the switch device 20 to the non-conduction state by suppressing the applying of the drive voltage to the terminal ACT-3. Accordingly, the drive voltage according to the electric power stored in the storage capacitor C0 is applied only to the terminal ACT-1 out of the terminals ACT-1 and ACT-2 of the switch device 10. In this case, the pull-in voltage of the switch device 10 is switched to the second pull-in voltage V2 higher than the first pull-in voltage V1.

Then, when the voltage value of the drive voltage applied to the terminal ACT-1 reaches the second pull-in voltage V2 as the electric power is stored in the storage capacitor C0 with the passage of time, the switch section SW1 of the switch device 10 is switched to the conduction state.

When the switch section SW1 of the switch device 10 is controlled to enter the conduction state, the electric power is supplied from the storage capacitor C0 to the DC-DC converter 40 via the switch section SW1. For example, in FIG. 18, a period denoted by reference numeral p22 indicates a period in which the electric power stored in the storage capacitor C0 is supplied to the DC-DC converter 40 when the pull-in voltage of the switch device 10 is controlled to be switched to the second pull-in voltage V2.

Then, the DC-DC converter 40 transforms the voltage value of the electric power supplied from the storage capacitor C0 and supplies the transformed electric power to the sensors 50a to 50c, the control section 60, and the communication control section 70. The control section 60 is driven on the basis of the electric power supplied from the DC-DC converter 40, reads various kinds of data stored in the storage section 80, and controls the operation of the communication control section 70 such that the read data is transmitted to the external device.

In the example illustrated in FIG. 18, the control section 60 sets the next operation mode to the first mode after the operation in the second mode. In other words, the pull-in voltage of the switch device 10 is set to the first pull-in voltage V1 again.

The example of the chronological operation of the information transmitting terminal 2 according to the second example, particularly, the chronological change in the voltage value according to the electric power stored in the storage capacitor C0 with the operation of the information transmitting terminal 2 has been described above with reference to FIG. 18.

4. CONCLUSION

As described above, in the switch device 10 according to one embodiment of the present disclosure (for example, see FIGS. 6 and 7), the switch section SW1 is switched to the conduction state by displacing the common movable electrode section 15 through a plurality of electrostatic actuators C11 and C12. At this time, the drive voltage is selectively applied to the electrostatic actuators C11 and C12, and thus the voltage value of the drive voltage for displacing the movable electrode section 15 is selectively switched in accordance with a combination of electrostatic actuators to be driven.

Further, the movable electrode section 15 is biased by the elastic force of the elastic members 159a and 159b in a direction opposite to the direction in which the movable electrode section 15 is displaced with the driving of the electrostatic actuators C11 and C12. Therefore, when the applying of the drive voltage to the electrostatic actuators C11 and C12 is stopped, the movable electrode section 15 is displaced by the elastic force of the elastic members 159a and 159b, and the switch section SW1 is switched to the non-conduction state.

Through this configuration, the switch device 10 according to the present embodiment can selectively switch the pull-in voltage (that is, the threshold value of the drive voltage) by selectively switching the drive target among a plurality of electrostatic actuators.

Further, when the switch device 10 according to the present embodiment is applied to the information transmitting terminal (for example, see FIG. 14), it is possible to detect whether or not the electric power stored in the storage capacitor C0 reaches the usable amount while performing switching in accordance with a purpose. Further, when the switch device 10 according to the present embodiment is applied, the information transmitting terminal need not consume the electric power to detect whether or not the electric power stored in the storage capacitor C0 reaches the usable amount. In other words, according to the information transmitting terminal according to one embodiment of the present disclosure, it is possible to selectively switch the pull-in voltage for switching whether or not the supply of the electric power from the storage capacitor C0 is performed in accordance with a purpose, and it is possible to suppress power consumption to be low.

A series of operations of the information transmitting terminal according to the above-mentioned embodiment can be constituted by a program causing a processor of a device for operating the components of the information transmitting terminal to function. This program may be configured to be executed via an operating system (OS) installed in the device. Further, a storage position of the program is not limited as long as the program can be read by a device having a configuration of perform the above-described process. For example, the program may be stored in a recording medium connected from the outside of the device. In this case, the processor of the device may be caused to execute the program when the recording medium having the program stored therein is connected to the device. Further, a computer-readable recording medium having the program recorded therein may be provided.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An electrostatic actuator, including:

a base section;

a movable electrode section held to be displaceable in a predetermined direction with respect to the base section; and a plurality of fixed electrodes fixed to the base section to be separated from the movable electrode section along a movable direction of the movable electrode section and face the movable electrode section, the plurality of fixed electrodes being electrically separated from each other, in which the electrostatic actuator is driven in accordance with a drive voltage selectively applied to the plurality of fixed electrodes and a voltage value of the drive voltage.

(2)

The electrostatic actuator according to (1), in which the plurality of fixed electrodes include a first fixed electrode and a second fixed electrode, and the voltage value of the drive voltage for driving differs in accordance with a combination of fixed electrodes to which the drive voltage is applied among the first fixed electrode and the second fixed electrode.

(3)

The electrostatic actuator according to (2), in which the first fixed electrode and the second fixed electrode differ in an area of a portion facing the movable electrode section.

(4)

The electrostatic actuator according to (3), in which in the plurality of fixed electrodes, at least one of the number of first fixed electrodes and the number of second fixed electrodes is two or more, and the number of the first fixed electrodes is different from the number of the second fixed electrodes.

(5)

The electrostatic actuator according to (3) or (4), in which a sum of the areas of the portion facing the movable electrode section in the first fixed electrode is a power of a sum of the areas of the portion facing the movable electrode section in the second fixed electrode.

(6)

The electrostatic actuator according to (2), in which the first fixed electrode and the second fixed electrode differ in a distance between a portion facing the movable electrode section and the movable electrode section.

(7)

The electrostatic actuator according to any one of (1) to (6), in which the movable electrode section includes a shaft member provided to extend along the movable direction and held to be displaceable in the movable direction, and a plurality of electrode members provided to extend from the shaft member in another direction intersecting the movable direction, and each of the plurality of fixed electrodes is provided to face at least one of the plurality of electrode members along the movable direction.

(8)

The electrostatic actuator according to (7), in which at least some fixed electrodes to which the common drive voltage is applied among the plurality of fixed electrodes are provided to be symmetrical with respect to the shaft member.

(9)

The electrostatic actuator according to (7) or (8), in which the shaft member is suspended on the base section by an elastic member, and the elastic member applies an elastic force so that the movable electrode section is biased in a direction away from the fixed electrode.

(10)

The electrostatic actuator according to (9), in which the elastic member has conductivity, and the shaft member is connected to a reference potential via the elastic member.

(11)

A switch device, including:

a base section;

a movable electrode section held to be displaceable in a predetermined direction with respect to the base section; and a plurality of fixed electrodes fixed to the base section to be separated from the movable electrode section along a movable direction of the movable electrode section and face the movable electrode section, the plurality of fixed electrodes being electrically separated from each other, in which switching between a conduction state and a non-conduction state between different terminals is performed in accordance with a drive voltage selectively applied to the plurality of fixed electrodes and a voltage value of the drive voltage.

(12)

The switch device according to (11), in which the movable electrode section includes a shaft member provided to extend along the movable direction and held to be displaceable in the movable direction, and a plurality of electrode members provided to extend from the shaft member in another direction intersecting the predetermined direction, each of the plurality of fixed electrodes is provided to face at least one of the plurality of electrode members along the movable direction, and when the shaft member is displaced in the movable direction, the switching between the conduction state and the non-conduction state between the different terminals is performed.

(13)

A power supply device, including:

a storage capacitor connected to an input section in parallel;

a supply control switch configured to include a movable electrode section held to be displaceable in a predetermined direction with respect to a base section and a plurality of fixed electrodes fixed to the base section to be separated from the movable electrode section along a movable direction of the movable electrode section and face the movable electrode section, the plurality of fixed electrodes being electrically separated from each other, and switch a connection relation between the storage capacitor and an output section between a conduction state and a non-conduction state; and a control section configured to switch a fixed electrode to which a drive voltage for driving the supply control switch is applied among the plurality of fixed electrodes, in which the supply control switch switches the connection relation in accordance with the drive voltage selectively applied to the plurality of fixed electrodes and a voltage value of the drive voltage.

(14)

The power supply device according to (13), in which the drive voltage is supplied from the storage capacitor.

(15)

The power supply device according to (13) or (14), in which the control section includes a self-storage type switch configured to switch a combination of fixed electrodes to which the drive voltage is applied among the plurality of fixed electrodes, and a pull-in voltage for switching the supply control switch to the conduction state and a pull-out voltage for switching the supply control switch to the non-conduction state are controlled by switching a state of the self-storage type switch.

(16)

The power supply device according to (15), in which the self-storage type switch includes a switch section configured to switch whether or not the drive voltage is applied to some fixed electrodes among the plurality of fixed electrodes, and a drive section configured to drive the switch section in accordance with a supplied control signal.

(17)

The power supply device according to (16), in which, in synchronization with a timing at which the supply control switch is controlled to enter the conduction state, a state of the switch section is switched so that the pull-out voltage is a predetermined voltage value in accordance with the pull-in voltage of the supply control switch at the timing.

(18)

The power supply device according to (16) or (17), in which a state of the switch section is held by performing control such that the control signal has high impedance.

(19)

The power supply device according to any one of (15) to (18), in which the supply control switch and the self-storage type switch are formed on the same base.

(20)

A program causing a power supply device, which includes a storage capacitor connected to an input section in parallel, and a supply control switch configured to include a movable electrode section held to be displaceable in a predetermined direction with respect to a base section and a plurality of fixed electrodes fixed to the base section to be separated from the movable electrode section along a movable direction of the movable electrode section and face the movable electrode section, the plurality of fixed electrodes being electrically separated from each other, and switch a connection relation between the storage capacitor and an output section between a conduction state and a non-conduction state, to execute:

selectively switching a fixed electrode to which a drive voltage for driving the supply control switch is applied among the plurality of fixed electrodes; and switching the connection relation in accordance with the drive voltage selectively applied to the plurality of fixed electrodes and a voltage value of the drive voltage.

REFERENCE SIGNS LIST 1 information transmitting terminal
10 switch device
11 base section
111 opening section
15 movable electrode section
151 shaft member
153 electrode member
159a, 159b elastic member
17 fixed electrode
20 switch device
30 power supply source
40 DC-DC converter
50a to 50c sensor
60 control section
70 communication control section
71 communication section
80 storage section

The invention claimed is:
1. An electrostatic actuator, comprising:
a base section;
a movable electrode section displaceable in a specific direction with respect to the base section; and
a plurality of fixed electrodes attached to the base section such that:
the plurality of fixed electrodes are separated from the movable electrode section along a movable direction of the movable electrode section,
the plurality of fixed electrodes face the movable electrode section,
the plurality of fixed electrodes are electrically separated from each other, wherein
the plurality of fixed electrodes include a first set of fixed electrodes and a second set of fixed electrodes,
the electrostatic actuator is driven based on a voltage value of a drive voltage selectively applied to at least one of the first set of fixed electrodes or the second set of fixed electrodes, and
the voltage value of the drive voltage is varied based on at least one of the first set of fixed electrodes or the second set of fixed electrodes to which the drive voltage is applied.

2. The electrostatic actuator according to claim 1,
wherein an area of a portion that faces the movable electrode section and each of the first set of fixed electrodes is different from an area of a portion that faces the movable electrode section and each of the second set of fixed electrodes.

3. The electrostatic actuator according to claim 2,
wherein at least one of a number of the first set of fixed electrodes or a number of the second set of fixed electrodes is at least two, and
the number of the first set of fixed electrodes is different from the number of the second set of fixed electrodes.

4. The electrostatic actuator according to claim 2,
wherein a sum of the areas of the portion that faces the movable electrode section in the first set of fixed electrodes is a power of a sum of the areas of the portion that faces the movable electrode section in the second set of fixed electrodes.

5. The electrostatic actuator according to claim 1,
wherein a distance between a portion that faces the movable electrode section and the first set of fixed electrodes is different from a distance between a portion that faces the movable electrode section and the second set of fixed electrodes.

6. The electrostatic actuator according to claim 1,
wherein the movable electrode section includes
a shaft member extended along the movable direction and displaceable in the movable direction, and
a plurality of electrode members extended from the shaft member in a direction that intersects the movable direction, and
each of the plurality of fixed electrodes faces at least one of the plurality of electrode members along the movable direction.

7. The electrostatic actuator according to claim 6,
wherein at least two fixed electrodes to which the drive voltage is applied among the plurality of fixed electrodes are symmetrically placed with respect to the shaft member.

8. The electrostatic actuator according to claim 6,
wherein the shaft member is suspended on the base section by an elastic member, and
the elastic member applies an elastic force such that the movable electrode section is biased in a direction away from the plurality of fixed electrode.

9. The electrostatic actuator according to claim 8,
wherein the elastic member is electrically conductive, and
the shaft member is connected to a reference potential via the elastic member.

10. A switch device, comprising:
a base section;
a movable electrode section displaceable in a specific direction with respect to the base section; and
a plurality of fixed electrodes attached to the base section such that
the plurality of fixed electrodes are separated from the movable electrode section along a movable direction of the movable electrode section,
the plurality of fixed electrodes face the movable electrode section,
the plurality of fixed electrodes are electrically separated from each other, wherein
the plurality of fixed electrodes include a first set of fixed electrodes and a second set of fixed electrodes,
switch between a conduction state and a non-conduction state between different terminals is executed based on a voltage value of a drive voltage selectively applied to at least one of the first set of fixed electrodes and the second set of fixed electrodes, and the voltage value of the drive voltage is varied based on at least one of the first set of fixed electrodes and the second set of fixed electrodes to which the drive voltage is applied.

11. The switch device according to claim 10,
wherein the movable electrode section includes
 a shaft member extended along the movable direction and displaceable in the movable direction,
 a plurality of electrode members extended from the shaft member in a direction that intersects the specific direction,
 each of the plurality of fixed electrodes faces at least one of the plurality of electrode members along the movable direction, and
 switch between the conduction state and the non-conduction state between the different terminals, based on displacement of the shaft member in the movable direction.

12. A power supply device, comprising:
a storage capacitor connected to an input section in parallel;
a supply control switch which includes
 a movable electrode section displaceable in a specific direction with respect to a base section,
 a plurality of fixed electrodes attached to the base section such that
 the plurality of fixed electrodes are separated from the movable electrode section along a movable direction of the movable electrode section,
 the plurality of fixed electrodes face the movable electrode section, and
 the plurality of fixed electrodes are electrically separated from each other, wherein
  the plurality of fixed electrodes include a first set of fixed electrodes and a second set of fixed electrodes, and
  the supply control switch configured to switch a connection between the storage capacitor and an output section between a conduction state and a non-conduction state; and
a control section configured to switch at least one of the first set of fixed electrodes or the second set of fixed electrodes to which a drive voltage to drive the supply control switch is applied, wherein
 the supply control switch is configured to switch the connection based on the drive voltage selectively applied to at least one of the first set of fixed electrodes or the second set of fixed electrodes, and
 a voltage value of the drive voltage is varied based on at least one of the first set of fixed electrodes and the second set of fixed electrodes to which the drive voltage is applied.

13. The power supply device according to claim 12,
wherein the drive voltage is supplied from the storage capacitor.

14. The power supply device according to claim 12,
wherein the control section includes a self-storage type switch configured to switch a combination of fixed electrodes to which the drive voltage is applied among the plurality of fixed electrodes, and
a pull-in voltage to switch the supply control switch to the conduction state and a pull-out voltage to switch the supply control switch to the non-conduction state are controlled based on change of a state of the self-storage type switch.

15. The power supply device according to claim 14,
wherein the self-storage type switch includes
 a switch section configured to switch based on whether the drive voltage is applied to at least one fixed electrode among the plurality of fixed electrodes, and
 a drive section configured to drive the switch section based on a supplied control signal.

16. The power supply device according to claim 15,
wherein, in synchronization with a timing at which the supply control switch is controlled to enter the conduction state, a state of the switch section is switched so that the pull-out voltage is a specific voltage value based on the pull-in voltage of the supply control switch at the timing.

17. The power supply device according to claim 15,
wherein a state of the switch section is controlled such that the supplied control signal has high impedance.

18. The power supply device according to claim 14,
wherein the supply control switch and the self-storage type switch are formed on a same base section.

* * * * *